(12) United States Patent
Moody et al.

(10) Patent No.: US 10,395,882 B1
(45) Date of Patent: Aug. 27, 2019

(54) TUNABLE QUANTUM CONFINEMENT AND QUANTUM DOT PHOTOCATHODE

(71) Applicant: LOS ALAMOS NATIONAL SECURITY, LLC, Los Alamos, NM (US)

(72) Inventors: Nathan Moody, Los Alamos, NM (US); Jeffrey Pietryga, Los Alamos, NM (US); Istvan Robel, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 15/799,796

(22) Filed: Oct. 31, 2017

Related U.S. Application Data

(60) Provisional application No. 62/415,457, filed on Oct. 31, 2016.

(51) Int. Cl.
*B82Y 20/00* (2011.01)
*H01J 29/48* (2006.01)
*H01J 29/04* (2006.01)
*B82Y 10/00* (2011.01)

(52) U.S. Cl.
CPC ............ *H01J 29/481* (2013.01); *H01J 29/04* (2013.01); *B82Y 10/00* (2013.01); *H01J 2201/3423* (2013.01); *H01J 2229/8926* (2013.01); *Y10S 977/774* (2013.01); *Y10S 977/813* (2013.01); *Y10S 977/824* (2013.01); *Y10S 977/939* (2013.01)

(58) Field of Classification Search
None
See application file for complete search history.

(56) References Cited

U.S. PATENT DOCUMENTS

| | | | |
|---|---|---|---|
| 2004/0129891 A1* | 7/2004 | Takagi | H01J 37/244 250/397 |
| 2014/0061486 A1* | 3/2014 | Bao | G01J 3/0213 250/370.01 |
| 2016/0261086 A1* | 9/2016 | Pruneri | H01S 3/106 |
| 2016/0264920 A1* | 9/2016 | Yang | C12M 29/04 |

OTHER PUBLICATIONS

Makarov, N, et al., "Quantum dot thin-films as rugged, high-performance photocathodes", Nano Letters, 2017, 17(4), pp. 2319-2327.

* cited by examiner

*Primary Examiner* — Dedei K Hammond
(74) *Attorney, Agent, or Firm* — Lewis Roca Rothgerber Christie LLP

(57) ABSTRACT

A tunable photocathode for use in vacuum electronic devices includes a nanostructured photoemission layer including quantum confined nanostructures, such as quantum dots. The quantum confined nanostructures can be tuned (e.g., prepared to have various characteristics or parameters) in order to independently optimize various characteristics of the electron beam emitted by the photocathode. For example, by changing the material composition, size and geometry of the quantum confined nanostructures, the energy levels of the quantum confined nanostructures in the photoemission layer can be tuned to provide a photocathode having a high quantum efficiency, low emittance, fast response time to incident light pulses, long operational lifetime, and increased environmental stability compared with conventional photocathodes and cathodes in vacuum electronic devices.

20 Claims, 8 Drawing Sheets

TUNABLE QUANTUM CONFINEMENT AND QUANTUM DOT PHOTOCATHODE

CROSS-REFERENCE TO RELATED APPLICATION

This application claims priority to and the benefit of U.S. Provisional Application No. 62/415,457, filed Oct. 31, 2016 and titled "TUNABLE QUANTUM CONFINEMENT AND QUANTUM DOT PHOTOCATHODE", the entire content of which is incorporated herein by reference.

STATEMENT REGARDING FEDERALLY SPONSORED RESEARCH OR DEVELOPMENT

The United States government has certain rights in this invention pursuant to Contract No. DE-AC52-06NA25396 between the United States Department of Energy and Los Alamos National Security, LLC for the operation of Los Alamos National Laboratory.

BACKGROUND

A host of vacuum electronic applications require electron beams having high brightness, high peak- and average-currents, low transverse and/or longitudinal emittances, prompt response times, and long shelf and operational lifetimes for maximum performance. Satisfying these divergent target parameters is a challenge that motivates development and optimization of new photoemissive materials, with particular emphasis on materials with controllable emission properties.

SUMMARY

According to embodiments of the present disclosure, a tunable photocathode can be tailored to emit an electron beam with specific properties. In some embodiments, the tunable photocathode includes a photoemission layer including quantum confined nanostructures.

In some embodiments, the tunable photocathode may further include a substrate under the photoemission layer. In some embodiments, the substrate may include a conductive material selected from Au, Ag, Al, In, Mg, Ca, Zr, stainless steel, ITO, and/or IZO. In some embodiments, the tunable photocathode may further include a resonant tunneling transmission layer on the photoemission layer.

In some embodiments, the photoemission layer may have a thickness of about 10 nm to about 1 μm. In some embodiments, the quantum confined nanostructures in the photoemission layer may include one or more elements selected from Cu, Ag, Zn, Cd, Hg, Ga, In, Si, Ge, Sn, P, As, Sb, S, Se, and Te. The quantum confined nanostructures may include at least one semiconductor material selected from a Group IV semiconductor, a II-VI semiconductor, a IV-VI semiconductor, a III-V semiconductor, a II-V semiconductor, and a I—III-VI semiconductor. The quantum confined nanostructures may include at least one selected from CdSe, ZnSe, CdS, ZnS, and PbSe.

In some embodiments, the quantum confined nanostructures may include one or more semiconductor quantum dots (QDs). In some embodiments, the semiconductor quantum dots may include two or more semiconductor materials and may have a core/shell structure or a heterostructure. In some embodiments, the semiconductor quantum dots may include quasi-type-II CdSe/CdS core/shell quantum dots. In some embodiments, the quantum confined nanostructures may include one or more ligands selected from $F^-$, $Cl^-$, $Br^-$, $I^-$, $S^{2-}$, $OH^-$, $N_3^-$, $SCN^-$, $CN^-$, $SeCN^-$, $HS^-$, $HSe^-$, $NH_2^-$, $PbSe_2^{2-}$, $SnS_4^{4-}$, and ligands including a thiol group, an amine group, a carboxylate group, and/or a phosphonate group.

According to embodiments of the present disclosure, a vacuum electronic device includes the photocathode, an anode, and a light source. The photocathode and anode are under vacuum and the light source is directed toward the photocathode.

According to embodiments of the present disclosure, a method of generating an electron beam includes exciting a photocathode with a light source to emit electrons. The photocathode includes a substrate and a photoemission layer on the substrate, and the photoemission layer includes quantum confined nanostructures. In some embodiments, the quantum confined nanostructures include one or more elements selected from Cu, Ag, Zn, Cd, Hg, Ga, In, Si, Ge, Sn, Pb, P, As, Sb, S, Se, and Te. In some embodiments, the quantum confined nanostructures include at least one semiconductor material selected from a Group IV semiconductor, a II-VI semiconductor, a IV-IV semiconductor, a III-V semiconductor, a II-V semiconductor, and a I—III-VI semiconductor. In some embodiments, the quantum confined nanostructures include at least one selected from CdSe, ZnSe, CdS, ZnS, and PbSe.

BRIEF DESCRIPTION OF THE DRAWINGS

These and other features and advantages of the present invention will be better understood by reference to the following detailed description when considered in conjunction with the accompanying drawings, in which.

DETAILED DESCRIPTION

Figure 1A:
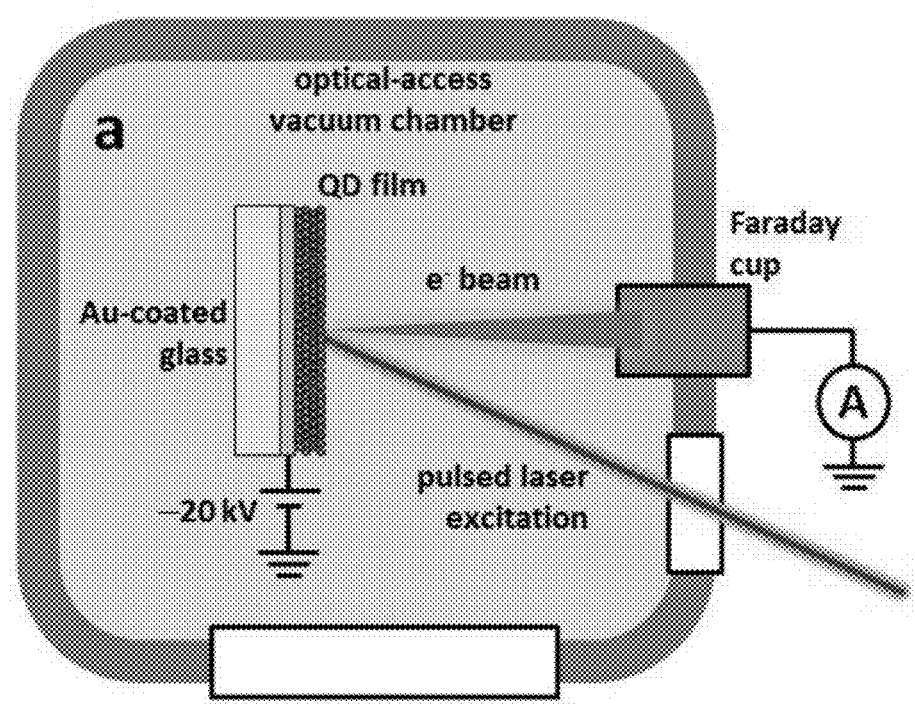
FIG. 1A is a schematic diagram illustrating an experimental setup for testing electron photoemission from quantum confinement or quantum dot (QD) photocathodes according to embodiments of the present disclosure. A photocathode including a QD film deposited on an Au-coated glass substrate is excited via pulsed laser excitation at a 20° angle to normal through an optical port of the vacuum chamber. The cathode is kept at −20 kV bias to facilitate collection of photoelectrons (e-beam) into a Faraday cup, where the photocurrent is measured by a Keithley 6517B electrometer.

A photocathode is a negatively charged electrode that emits electrons only upon illumination with light. Photocathodes are of interest for use in vacuum electronic devices (such as particle accelerators, X-ray sources, electron microscopes, etc.) whose function is dependent on emitting radiation in the form of a coherent electron beam.

In such electron beam applications, it is desirable to be able to time-gate, or pulse the electron beam (e.g., turn the electron beam on/off) on very short timescales. Vacuum electronic devices in the related art have used cathodes that rely on thermionic (thermally induced) electron emission to produce an electron beam. The temperature transitions associated with initiation and quenching of such thermionic emission (either on its own or by building up an opposing electric field) occur on relatively long timescales; thus, the use of thermionic vacuum electronic devices in time-gating applications has been limited. In contrast, photoemission is dependent on excitation by photons, which can be quickly turned on and off. Thus, vacuum electronic devices using photocathodes can time-gate on picosecond timescales.

A photocathode necessarily includes a photoemissive material (e.g., a material capable of emitting electrons upon exposure to light) to mediate photon absorption and electron emission. Several alkali antimonide compounds and III-V semiconductor compounds have been used as photoemissive compounds in the related art. However, these materials are generally unstable to even trace amounts of contaminating gases (e.g., oxygen and water vapor) and typically must be used under stringent vacuum conditions. In addition, the range of achievable electron beam characteristics has been limited by the narrow range of suitable materials and a lack of mechanisms for independently tuning or optimizing the emission properties of these materials. Therefore, further development of photocathodes has also been limited by the current range of available photoemissive compounds.

Example electron beam characteristics that are determined by the characteristics of the photoemissive material in the photocathode include quantum efficiency (QE), emittance, responsiveness to incident pulsed light (e.g., response time), operational lifetime, and environmental stability (e.g., ruggedness or lack of sensitivity to water and oxygen in the environment). As used herein, the terms "quantum efficiency" and "quantum yield" are interchangeably used in their art-recognized senses to refer to the efficiency with which photons are converted into free electrons, and may be calculated as the ratio of the number of emitted electrons (e.g., current) to the number of incident photons/cm²s. The quantum efficiency (QE) determines the achievable peak and average current at a given laser intensity and duration (high→good). As used herein, the term "emittance" is used in its art-recognized sense to describe the degree or amount of spatial spreading in the electron beam and/or momentum divergence between individual electrons as the beam propagates (low→good). The operational lifetime is a measure of how long the photocathode can be used (long→good). Ruggedness describes the sensitivity of the photocathode activity to the photocathode environment (insensitive-→good); and response speed refers to the time required to start or stop electron beam generation (fast→good).

In photocathode materials of the related art, the five characteristics described above are variously linked, such that simultaneous optimization is not practical, and/or requires limiting or undesirable tradeoffs. For example, photoemissive metals in the related art exhibit fast response times due to their short laser penetration depth and low work function (e.g., due to electron-electron (e-e) scattering). As used herein, the term "laser penetration depth" refers to the depth into a layer or thin film (e.g., a cathode) from the surface to which an incident laser or photons are able to travel. However, the high rate of electron scattering also means that relatively few electrons are emitted and the QE is low. As another example, photoemissive bulk semiconductors exhibit relatively improved QEs compared to metals due to their deeper laser penetration depths and electronic structures that prevent or reduce e-e scattering and instead allow electron-phonon (e-p) scattering, which is comparatively less detrimental to electron emission rates. However, bulk semiconductors also exhibit dramatically lengthened response times and increased beam emittance due to energy spread. As another example, cesium terminated GaAs and GaAsP surfaces exhibit negative electron affinities, such that thermalized electron populations generated deep within the volume of the material (e.g., up to a micron from the surface or an interface of the material) can be emitted at high QE and low emittance. Again, however, the thermalized electrons in the bulk require extra time to travel the extra corresponding distance, resulting in long response times. As used herein, the term "bulk" is used in its art-recognized sense to describe a volume or amount of material that does not exhibit quantum confinement effects, and therefore exhibits substantially uniform properties within the volume of the material that are substantially identical to the properties that would be exhibited in an infinite amount of the same material. A bulk material may have a grain size larger than a nanoparticle (e.g., an average diameter larger than about 100 nm). In some embodiments, when a bulk semiconductor photocathode is used, the semiconductor material may be formed as a single grain on the photocathode.

In general, in these materials of the related art, the same mechanisms that can improve QE have the negative consequences of compromising response time and emittance, and vice versa. This is because each of the above photocathode characteristics depends on electron transport through the bulk material of the photocathode, the fixed energy bands of the material, and/or the conditions at the photocathode surface. As a result, both QE and emittance increase as photon energy increases, and the QE generally increases as the response time increases. This means that for conventional bulk photocathodes, whose material properties are fixed, laser wavelength, spot size, intensity, and pulse duration are the only controllable parameters. Unfortunately, these parameters are linked in a manner exactly opposite of what is desired. These inherent limitations of conventional materials have presented a challenge to achieving the desired improvements in photocathode performance. In comparison to photocathodes including these bulk materials, photocathodes including quantum confined nanostructures, as described in embodiments herein, have unique electronic and structural properties that result in different relationships between the parameters of the emitted electron beam.

Quantum dots and other quantum confined nanostructures are of interest as chemically robust materials having electronic structures and carrier behaviors that can be tuned using various methods to result in enhanced photoemission. For example, the effects of quantum confinement (such as discretization of the electronic density-of-states and/or relaxation of carrier momentum considerations) may be exploited to suppress or reduce beam emittance without decreasing the QE. In some embodiments, even simple engineering (in the form of size control) can have a substantial impact on photoemission efficiency.

According to one or more embodiments of the present disclosure, nanocrystals or nanostructures exhibiting properties associated with quantum confinement (e.g., reduced dimensionality materials or quantum confined nanostructures) may be used as photoemissive materials to construct a robust photocathode. As used herein, the representative and interchangeable terms "quantum confinement", "reduced dimensionality", and "quantum confined" are used in their art-recognized senses to refer to a state in which a material (e.g., a particle, nanostructure, or crystal) has a grain size or diameter in at least one dimension that is smaller than twice the exciton Bohr radius. The confinement of electrons along such a dimension (i.e., the dimension that is smaller than twice the exciton Bohr radius) causes the allowable energy levels of charge carriers in the material to be discretized (quantized) instead of continuous, which then leads to behaviors that are of interest for photocathodes, as will be described herein. The use of quantum dots and quantum confined nanostructures to form efficient and robust photocathodes exploits the propensity of these materials to photo-ionize (e.g., to form one or more charged species in response to light).

Further, quantum confined nanostructures according to embodiments of the present disclosure can be easily tuned (e.g., prepared to have various characteristics or parameters) in order to independently optimize various characteristics of the electron beam produced by the photocathode. Indeed, the ability to tune electron affinities and confined energy states by precisely controlling the grain size of the nanostructure may enable suppression of beam emittance without decreasing the photoemission QE. This can be done, in part, because photoemission occurs in three steps: absorption of incident light (e.g., 'drive laser') to generate an excited electron; transport of the excited electron to the surface; and transmission of the excited electron through the potential barrier that exists at the surface of the material. The time scale, free energy change, efficiency, etc. of each step of this mechanism may affect one or more characteristics of the resultant emitted electron beam. The outcome of each step of the mechanism, and thereby the characteristics of the resultant emitted electron beam, may be independently affected by various parameters of the quantum confined nanostructure.

For example, the quantum confined nanostructure can be tuned to have strong optical absorption at a wavelength matching that of the light source, thereby enhancing the QE because more photons are absorbed in the absorption step. In some embodiments, this can be achieved by changing the chemical composition of the nanostructure. In some embodiments, this can be achieved by selecting a suitable nanostructure size, shape, and/or geometry (e.g., a quantum confined nanostructure having the form of a quantum dot, nanowire, or planar 2D film), as described herein. These parameters may collectively dictate the energy levels available for electronic occupation, excitation, and emission. In addition, because emission occurs from electrons excited near the surface of the quantum confined nanostructure, such that the wavefunctions of the excited electrons actually extend beyond the surface of the nanostructure, electron emission in the quantum confined nanostructure is not subject to the frustrated transport that dominates the behavior of bulk materials. The excited electron essentially avoids or minimizes the transport step, and emittance is improved (e.g., decreased) because electronic emission originates from a defined energy level, and because the exciton in a quantum confined photocathode is not forced to traverse large lattice distances (which is accompanied by scattering that introduces energy spread into the beam). Likewise, the ionization potential (e.g., the valence band energy) and the electron affinity (e.g., the conduction band energy) of the quantum confined nanostructure can be tuned to match the wavelength of the light source, thereby minimizing the use of excess electron excitation energies that directly contribute to increased emittance. In some embodiments, these values can be tuned by changing the composition of the quantum confined nanostructure, and in other embodiments, by changing the size of the quantum confined nanostructure. It will be understood that the composition and size of the quantum confined nanostructure can be independently changed so as to optimize both absorption onset and valence/conduction band energies. That is, in some embodiments, the design parameters of quantum confined nanostructures map to independent characteristics of the electron beam, allowing QE and emittance to be simultaneously targeted for optimization. Finally, the ability to tune quantum confined nanostructure carrier excitation lifetimes may enable tuning of the photocathode response time.

A moments-based excitation/transport/emission theoretical model has been successfully used to predict photoemission in resonant tunneling diodes (RTDs), in which quantized energy states enable behaviors of technological interest, such as negative differential resistance. Preliminary theoretical studies of graphene layers on surfaces indicate that similar physical phenomena occur in quantum confined nanostructure and heterostructure configurations, in which photoemission is enhanced by resonance effects. The profound consequence of these phenomena is that emission can be further controlled by tuning the electronic structure of the intrinsic material and/or the quantum resonance levels of an overlying 2D tunneling barrier such as graphene, which may again lead to the desired outcome of decoupling of quantum efficiency and emittance.

According to example embodiments of the present disclosure, a tunable photocathode includes a photoemission layer including a thin film including quantum confined nanostructures. In some embodiments, the photocathode further includes a substrate under the photoemission layer in order to provide mechanical support.

The photoemission layer includes one or more quantum confined nanostructures as the photoemissive material. In some embodiments, the quantum confined nanostructures may be deposited as a solid thin film. The characteristics or parameters of the quantum confined nanostructure included in the photoemission layer may be selected according to their suitability for the desired photocathode application. For example, the composition, size, and shape of the quantum confined nanostructure may be selected according to their effects on the electronic structure of the quantum confined nanostructure, the compatibility of the resulting quantum confined nanostructure with the light source(s) used in the photocathode application, and/or the desired characteristics of the emitted electron beam when the quantum confined nanostructure is incorporated into the photocathode, as described herein according to embodiments of the present disclosure. In general, the parameters of the quantum confined nanostructure may be selected to allow absorption of light energy in the ultraviolet (UV) to near-infrared (NIR).

That is, the photoemission layer may include one or more nanostructures that exhibit tunable quantum confinement. In some embodiments, for example, the photoemission layer may include compositionally graded semiconductor materials that are used in heterostructure architectures, modified with controlled surface ruggedness, and/or formed as nanoscale structures that allow discrete energy levels. In some embodiments, these materials and architectures may result in quantum tunneling and/or resonant carrier transport. Representative methods of tuning the electronic structures of these quantum confined nanomaterials, such as those discussed herein, enable the tailoring of transport and emission of photoexcited electrons which, in turn, tailors the emitted electron beam.

The dimensionality (e.g., number of dimensions that are not quantum-confined) of the quantum confined nanostructure may be 0, 1, or 2. Any suitable nanomaterial structure may be used as long as it exhibits quantum confinement and discretized energy levels. As used herein, the term "reduced dimensionality nanomaterial" is used in its art-recognized sense to refer to a nanostructure in which excitons exhibit quantum confinement effects due to the small characteristic dimension(s) of the nanostructure, as described above. Non-limiting examples of such reduced dimensionality nanomaterials include quantum dots and nanoparticles (zero dimensional), quantum wires, nanowires, nanorods, and nanotubes, etc. (one dimensional), and nanoplates, nanoplatelets, nanocoatings, nanosheets, and nanofilms (two dimensional).

In some embodiments, for example, when the quantum confined nanostructure is two dimensional, the quantum confined nanostructure may be a flattened nanocrystal (e.g., "nanoplate", etc.) that is elongated in two dimensions to form a planar structure (and is therefore quantum confined in one of three dimensions). In some embodiments, the flattened nanocrystal may have an average thickness of about 1 nm to about 20 nm, and in some embodiments, about 2 nm to about 10 nm, while the average width and average length of the flattened nanocrystal may each independently be about 10 nm to about 100 nm, for example about 20 nm. Here, the average width and average length of the flattened nanocrystal are not particularly limited as long as both are nanoscale and larger than the average thickness, for example with an aspect ratio (length/thickness or width/thickness) of about 2:1 to about 5:1, and in some embodiments about 3:1 to about 5:1.

In some embodiments, when the quantum confined nanostructure is one dimensional, the quantum confined nanostructure may be a rod-shaped nanocrystal (e.g., "nanorod") that is elongated along one direction (and is therefore quantum confined in two of three dimensions). In some embodiments, the rod-shaped nanocrystal may have an average thickness and width (e.g., cylindrical diameter) of about 1 nm to about 20 nm, and in some embodiments about 2 nm to about 10 nm, while the average length of the rod-shaped nanocrystal may be about 10 nm to about 100 nm, for example, about 20 nm to about 50 nm. Here, the average length of the rod-shaped nanocrystal is not particularly limited as long as it is nanoscale and larger than the average thickness and width, for example with an aspect ratio (length/width) of about 2:1 to about 5:1, and in some embodiments about 3:1 to about 5:1. In some embodiments, when the quantum confined nanostructures include a film of aligned nanorods (e.g., nanorods having substantially the same lengthwise orientation), the aligned nanorods may enable additional control over the emitted electrons by increasing the amount of polarization upon excitation.

In some embodiments, when the quantum confined nanostructure is zero dimensional, the quantum confined nanomaterial may be a quantum dot (QD). As used herein, the representative and interchangeable terms "quantum dot" and "QD" are used in their art-recognized sense to refer to a zero-dimensional quantum confined nanomaterial, as further described herein. Each of the three spatial dimensions of a quantum dot are small enough for quantum confinement effects to emerge in all dimensions. The term "quantum dot" may also refer to a crystalline particle formed of one or more semiconductor materials and having a size on the order of nanometers (e.g., having an average diameter of about 1 nm to about 50 nm; for example, about 1 nm to about 20 nm, and in some embodiments, about 2 nm to about 10 nm) in all three dimensions. It will be understood that although embodiments of the present disclosure in which the quantum confined nanostructure is a quantum dot may be described, the scope of the present disclosure is not limited thereto, and that those having ordinary skill in the art are capable of selecting and preparing other quantum confined nanostructures and photocathodes according to the principles described herein.

When the quantum confined nanostructure is a quantum dot (QD), the shape (morphology) of the QDs is not particularly limited. In some embodiments, the QD may be a particle having a centrosymmetric, convex, and regular or semi-regular shape (e.g., habit). Non-limiting examples of such shapes may include cubes, rhomboids, tetrahedrons, hexagonal prisms, octahedrons, and spheres. In some embodiments, the QD may be spherical (e.g., may have the shape of a sphere). When the semiconductor QD included in the photoemission layer has a shape similar to that of a cube, rhomboid, etc., the QD may have an average diameter of about 1 nm to about 20 nm, and in some embodiments, about 2 nm to about 10 nm. That is, the QD may be less than about 20 nm in each dimension, and in some embodiments, less than about 10 nm in each dimension.

In some embodiments, the QD may be formed in more a complex shape, such as a multi-armed nanostructure. Non-limiting examples of such multi-armed nanostructures include tetrapods, octopods, star-shaped particles, etc. When the semiconductor QD has a multi-armed nanostructure shape, the average diameter of the QD (measured as the diameter of the smallest sphere or ellipsoid enclosing the QD) may be about 1 nm to about 20 nm, and in some embodiments about 2 nm to about 10 nm.

The quantum confined nanostructure included in the photoemission layer of a photocathode, according to embodiments of the present disclosure, may include a single semiconductor material or a combination of two or more semiconductor materials. In some embodiments, when the quantum confined nanostructure includes a combination of two or more semiconductor materials, the different materials may be physically arranged in various suitable geometries to form a heterostructure. As used herein, the term "heterostructure" may refer to a structure including dissimilar materials in adjacent regions. For example, in some embodiments, the quantum confined nanostructure may be a quantum dot having a core/shell structure, in which a shell or solid particle (core) made of one material is enveloped or enclosed by a larger shell made of a second material, which itself may be enveloped by an even larger shell made of the first material or another material, and so on. In some embodiments, when the quantum confined nanostructure is a quantum dot (QD), the QD may have an open heterostructure such as the structure of a "Janus"-type nanoparticle, in which different semiconductor materials are bonded side-by-side to each other (e.g., as opposing hemispheres).

In some embodiments, the heterostructured quantum confined nanostructures may be band engineered, and for example, may have "type-II" or "quasi-type-II" electronic structures. The term "band engineered" is used herein in its art recognized sense to refer to a material having a band gap that can be systematically altered or controlled, for example, by selecting suitable combinations of semiconductor materials that can be combined in a gradient to select an intermediate composition and band gap energy, or can be layered in alternating structures to thereby form quantum wells having width-dependent allowed energies. In some embodiments, the efficiency of emission may be increased by the improved spatial separation of excited electrons and holes after photoexcitation.

In some embodiments, each semiconductor material may have a composition including one or more elements selected from Groups IB-VI, (i.e., Groups 11-16). For example, the composition may include one or more elements selected from copper (Cu), silver (Ag), zinc (Zn), cadmium (Cd), mercury (Hg), gallium (Ga), indium (In), carbon (C), nitrogen (N), oxygen (O), silicon (Si), germanium (Ge), tin (Sn), lead (Pb), phosphorus (P), arsenic (As), antimony (Sb), sulfur (S), selenium (Se), and tellurium (Te).

In some embodiments, each semiconductor material may be a single element, a binary compound, or a tertiary compound. As used herein, the terms "single element", "binary compound", and "tertiary compound" may refer to a composition including one, two, and three elements, respectively. In some embodiments, the semiconductor may be an alloy or mixture of two or more semiconductor materials.

In some embodiments, the semiconductor material may be a Group IV semiconductor or a compound semiconductor composed of elements selected from Group IV. Non-limiting examples of Group IV semiconductor materials include Si, Ge, and Sn nanocrystals, alloys of Si, Ge, and/or Sn (e.g., GeSn, SiGe, and/or SiSn), crystalline binary compounds such as SiC, and core/shell and open heterostructures including two or more of these compounds or alloys.

In some embodiments, the semiconductor material may be a II-VI semiconductor, e.g., a semiconductor composed of at least one element selected from Group IIB and at least one element selected from Group VI. Non-limiting examples of II-VI semiconductor materials include CdSe, ZnSe, CdTe, ZnTe, ZnS, HgS, HgSe and HgTe, alloys combining multiple II-VI materials (e.g., CdZnSe), CdSe/CdS core/shell structures, and other core/shell and open heterostructures including two or more of these compounds or alloys. In some embodiments, the photoemission layer may be formed of quasi-type-II CdSe/CdS core/shell QDs.

In some embodiments, the semiconductor material may be a IV-VI semiconductor, e.g., a semiconductor composed of at least one element selected from Group IV and at least one element selected from Group VI. Non-limiting examples of IV-VI semiconductor materials include PbSe, PbS, PbTe, SnTe, and SnSe, alloys combining multiple IV-VI materials (e.g., PbSeS), heterostructures of PbSe/CdSe, PbS/CdS and PbTe/CdTe, and other core/shell and open heterostructures involving two or more of these compounds or alloys.

In some embodiments, the semiconductor material may be a III-V semiconductor, e.g., a semiconductor composed of at least one element selected from Group III and at least one element selected from Group V. Non-limiting examples of III-V semiconductor materials include any single-component, alloy or heterostructured QD comprising one or more selected from GaP, GaAs, GaSb, InN, InP, InAs, and InSb.

In some embodiments, the semiconductor material may be a II-V semiconductor, e.g., a semiconductor composed of at least one element selected from Group II and at least one element selected from Group V. Non-limiting examples of II-V semiconductor materials include any single-component, alloy or heterostructured QD comprising one or more selected from $Zn_3P_2$, $Cd_3P_2$, and $Cd_3As_2$.

In some embodiments, the semiconductor material may be a I—III-VI semiconductor, e.g., a semiconductor composed of at least one element selected from Group IB, at least one element selected from Group III, and at least one element selected from Group VI. For examples, at least one element may be selected from Cu and Ag (Group IB); at least one element may be selected from Al, Ga, and In (Group III); and at least one element may be selected from S, Se, and Te (Group VI). Non-limiting examples of I—III-VI semiconductor materials include any single-component, alloy, or heterostructured materials comprising one or more compounds containing Group IB, Group III, and/or Group VI elements.

In some embodiments, the semiconductor material may be a mixture or combination of two or more of the above described classes of materials. For example, a Group IV semiconductor and a II-VI semiconductor may combine side-by-side, as core/shell particles, or in alternating layers to form a heterostructured material. Non-limiting examples of such semiconductor materials include heterostructures of Group IV (e.g., Si or Ge) with II-VI compounds (e.g., Ge/CdS), heterostructures combining III-V and II-VI compounds (e.g., InP/CdSe and InAs/ZnSe core/shell QDs), and heterostructures and alloys combining I-III-VI and II-VI compounds (e.g., $CuInS_2$/ZnS core/shell QDs, and CuZnInS alloy QDs).

The quantum confined nanostructure or QD may be prepared via any suitable method available in the art for synthesizing a quantum confined nanostructure or QD, depending on the desired size and morphology of the resulting quantum confined nanostructure or QD. Non-limiting examples of such methods may include solution methods, plasma methods, electrochemical assembly, physical size reduction, and high temperature dual injection. In some embodiments, the QD may be synthesized via solution-based, "colloidal" methods. In some embodiments, the QD may be synthesized via, for example, RF plasma methods in order to create free-standing QD dispersions. In some embodiments, the QD may be synthesized by physical size reduction (e.g., grinding of bulk material to produce nanoparticles). Such synthesis methods are known to those having ordinary skill in the art, and the skilled artisan is capable of selecting an appropriate method and associated parameters based on the desired resultant quantum confined nanostructure.

In some embodiments, the quantum confined nanostructure or QD may be further treated to enhance the conductivity of the nanostructure and/or the photoemission layer including the nanostructure. For example, QDs prepared via colloidal synthesis are typically surface passivated with long-chain ligands to prevent or reduce their further growth or agglomeration in solution. However, the hydrophobic and non-polar portions of these ligands may impede carrier transport when the QDs are assembled into close-packed solid films. Accordingly, strategies for improving the conductivity of the QDs and/or the photoemission layer including the QDs may encourage carrier transport and improved photocathode function.

In some embodiments, when the quantum confined nanostructures or QDs are synthesized using hydrophobic long-chain ligands, the ligands may be removed and/or replaced (e.g., exchanged) with shorter and/or more electrically conductive (polar) species. Non-limiting examples of such species may include small molecule ligands including thiol, amine, carboxylate, phosphonate, and other Lewis-basic functional groups; anions (e.g., halides ($F^-$, $Br^-$, $Cl^-$, and $I^-$), chalcogenides ($S^{2-}$), $OH^-$, $N_3^-$, $SCN^-$, $CN^-$, $SeCN^-$, $HS^-$, $HSe^-$, and $NH_2^-$); and metal-based cluster anions (e.g., $PbSe_2^{2-}$, $SnS_4^{4-}$).

In some embodiments, the ligand removal/exchange process may involve exposure of the quantum confined nanostructures or QDs to chemicals that: 1) react with the ligands, thereby causing them to detach from the quantum confined nanostructure or QD surfaces; or 2) competitively displace the ligands from the surface. After the quantum confined nanostructure or QD surfaces are modified in this way (i.e., ligands are removed or replaced) the formerly attached ligands and/or their byproducts may be subsequently rinsed away. Non-limiting examples of reagents used to react with the ligands include mineral acids (e.g., HCl, $H_2SO_4$, $HNO_3$, etc.), bases (e.g., NaOH, KOH, etc.), ligand-containing salts ($NH_4I$, $NH_4Cl$, NaI, NaCl, etc.), oxidants (e.g., $H_2O_2$, $Cl_2$, $I_2$, etc.), and reductants (e.g., oxalic acid, $NaBH_4$, etc.). In some embodiments, a product of the reagent-ligand reaction may subsequently act as a species that competitively displaces the ligands from the surface.

In some embodiments, the quantum confined nanostructure or QDs may be synthesized using methods that do not involve the use of such hydrophobic and non-polar ligands. In some embodiments, for example, the quantum confined nanostructures or QDs may be synthesized via RF-plasma or physical size-reduction methods, as described above, such that they do not have ligands and can be directly deposited in the photoemission layer without the need for ligand removal or replacement. In other embodiments, the quantum confined nanostructures or QDs prepared using methods that do not include ligands may be subsequently reacted with the chemicals described above to add ligands, for example, for further stabilization.

In some embodiments, after synthesis and/or ligand treatment, the quantum confined nanostructures may be deposited as a thin film on the substrate to thereby form the photoemission layer. The quantum confined nanostructures may be deposited using any suitable deposition method available in the art. In some embodiments, the quantum confined nanostructures are prepared as a dispersion and physically cast onto the substrate. When the quantum confined nanostructures are dispersed in a liquid solvent, the photoemission layer may be prepared by, e.g., drop-casting, spin-casting, dip-coating, doctor blading, or inkjet/spray deposition. When the dispersion of quantum confined nanostructures is in a carrier gas (such as when the quantum confined nanostructures are fabricated by radiofrequency (RF) plasma), the photoemission layer may be prepared by, e.g., direct impaction. The deposition parameters (e.g., solvent, carrier gas, deposition time, drying time, and/or temperature) for applying the quantum confined nanostructures using any of the above techniques may be appropriately selected according to the material to be deposited and the desired properties. These parameters are known to those having ordinary skill in the art, and the skilled artisan is capable of selecting appropriate reaction precursors and deposition parameters based on the desired resultant photoemission layer.

The thin film may be further processed prior to use. In some embodiments, the quantum confined nanostructures or QDs are not treated with ligand removal and/or exchange prior to deposition. Instead, these processes are performed after the quantum confined nanostructures have been deposited as a film. In such embodiments, the methods and reagents for treating the quantum confined nanostructures within the thin film (e.g., reacting in the solid state) are substantially the same as the methods and reagents used to treat the quantum confined nanostructures in dispersion or solution. In some embodiments, the films may be deposited by spin-coating over multiple layers and then chemically treated to remove original surface ligands and to enhance charge mobility.

In some embodiments, the conductivity of the photoemission layer may be increased by annealing the film (i.e., heating the film for a fixed period of time at high temperatures, for example, 300° C.) under vacuum, air, or an inert atmosphere (e.g., $N_2$ or Ar). In some embodiments, the conductivity of the photoemission layer may be increased by depositing chemical species in gaps between quantum confined nanostructures (e.g., "infilling"). Non limiting examples of such chemical species may include metals (such as Au, Ag, Cu, etc.), semiconductors (such as II-VI, IV-VI, III-V, II-V and I-III-VI compounds and alloys, etc.), or metal oxides (such as $Al_2O_3$, $SiO_2$, $TiO_2$, ZnO, $In_2O_3$, various transition metal oxides, etc.). The infilled chemical species may be deposited using any suitable method available in the art, for example, atomic layer deposition, or by chemically doping the film with solution or gas phase electroactive species to modify the population of charge carriers in the film.

The thickness of the photoemission layer is not particularly limited, and may be any thickness suitable for the desired or intended photoemission application. In some embodiments, the photoemission layer may have a thickness of about 50 nm to about 1 µm, for example, about 100 nm to about 800 nm, and in some embodiments, about 250 nm to about 600 nm. In some embodiments, the photoemission layer may be a thin film. As used herein, the term "thin film" may refer to a layer of material having a thickness on the scale of nanometers to micrometers, for example, about 1 nm to about 10 µm, and in some embodiments, about 5 nm to about 1 µm. In some embodiments, the quantum confined nanostructures may form a monolayer, and in other embodiments, the quantum confined nanostructures may include one or more layers, e.g., may form a bilayer or multilayer. The long-range order of the thin film is not particularly limited. In some embodiments, for example, the thin film may form a superlattice structure (e.g., may form a periodic structure including ordered quantum wells, as described herein in connection with the resonant tunneling transmission layer). In some embodiments, the thin film may be amorphous.

The substrate serves as a physical support for the photoemission layer, and may be formed of any suitable solid material as long as it is compatible with the photocathode environment (e.g., high vacuum, such as a vacuum pressure of about $10^{-8}$ mbar or less). For example, the substrate may include a glass, a metal, an alloy, certain polymer plastics (such as PVDF, PTFE, etc.), a ceramic, a crystalline material, or mixtures thereof. As used herein, the term "glass" may refer to a non-crystalline amorphous solid that exhibits a glass transition when heated; for example, silica glasses such as fused quartz, sodium borosilicate, aluminosilicate, and/or the like. As used herein, the term "ceramic" may refer to an inorganic and non-metallic solid comprising atoms held together in networks of ionic and covalent bonds; for example, silicon carbide, silicon nitride, zirconium oxide, and the like. As used herein, the term "crystalline material" may refer to an inorganic and non-metallic solid (such as a ceramic, metalloid, or the like) in which the comprising atoms are held together via ionic bonds and arranged with long-range periodicity; for example, quartz, silicon, anatase, rutile, etc. In some embodiments, the substrate may be formed of quartz, glass, or silicon.

In some embodiments, the substrate may specifically include a conductive material in order to improve electron emission. Without being limited to any particular mechanism or theory, it is believed that the conductive material may aid in replenishing emitted electrons, either by serving as an electron reservoir or by forming a conductive material-semiconductor junction that alters the carrier density distribution of the photoemission layer. Non-limiting examples of such conductive material may include a metal, an alloy, or a conductive metal oxide. When the conductive material is a metal, the metal may include any suitable alkaline earth metal, transition metal, or post-transition metal. For example, the metal may include gold (Au), copper (Cu), molybdenum (Mo), silver (Ag), aluminum (Al), indium (In), magnesium (Mg), calcium (Ca), or zirconium (Zr). When the conductive material is an alloy, the alloy may be a suitable steel or may combine two or more of the above metals. When the conductive material is a metal oxide, the metal oxide may include any suitable conductive oxide of a metal described above, for example, indium titanium oxide (ITO), indium zinc oxide (IZO), or the like.

In some embodiments, the substrate may have a single layer structure, in which the single layer is formed of one of the above materials. In some embodiments, the substrate may have a multi-layer structure, in which adjacent layers are formed of the same or different materials. For example, the substrate may include a base layer and a conductive layer on the base layer, where the base layer has the function of physically supporting and protecting the other layers from mechanical stress, and the conductive layer has the function of improving electron emission, as described above. In one embodiment, for example, the base layer may include a durable material (such as glass, quartz, etc.), and the conductive layer may include a conductive material (such as those described above, including gold). In some embodiments, the substrate may further include an adhesion layer between the conductive layer and the base layer in order to prevent or reduce delamination of the conductive layer from the base layer. However, embodiments of the present disclosure are not limited thereto, and the substrate may suitably include any number of layers in any configuration.

In some embodiments, when the substrate includes a conductive layer (e.g., a layer formed of a conductive material), the conductive material may be pre-formed as a foil, a sheet, a plate, etc., that is subsequently bonded to other layers. In some embodiments, the conductive material may be formed directly on another layer using any suitable deposition method available in the art, such as sputtering, spin coating, chemical vapor deposition (CVD), pulsed laser deposition (PVD), etc. The deposition parameters (e.g., material precursors, deposition times, and temperature) for applying the conductive material using any of the above techniques may be appropriately selected according to the material to be deposited and the desired layer properties. These parameters are known to those having ordinary skill in the art, and the skilled artisan is capable of selecting appropriate reaction precursors and deposition parameters based on the desired resultant conductive layer.

In some embodiments, when the substrate includes an adhesion layer, the material for forming the adhesion layer is not particularly limited as long as it is compatible with (e.g., non-reactive and can form a stable interface with) each of the materials of the base layer and the conductive layer. For example, when the substrate includes a base layer made of glass and a conductive layer made of Au, an adhesion layer including Cr may be positioned between the layers to prevent or reduce delamination (separation) of the conductive layer from the base layer. Non-limiting examples of other materials for the adhesion layer include Si, Ti, and Ni. The adhesion layer may be deposited using any suitable deposition method available in the art, such as sputtering, spin coating, chemical vapor deposition (CVD), pulsed laser deposition (PLD) or physical vapor deposition (PVD), etc. The deposition parameters (e.g., material precursors, deposition time, and temperature) for applying the conductive material using any of the above techniques may be appropriately selected according to the material to be deposited and the desired properties of the layer. These parameters are known to those having ordinary skill in the art, and the skilled artisan is capable of selecting appropriate materials and deposition parameters based on the desired resultant adhesion layer and its compatibility with other layers.

The thickness of each layer in the substrate is not particularly limited, and may be selected according to the desired overall thickness, cost, etc. The base layer and/or the substrate as a whole may have any suitable thickness as long as it provides sufficient mechanical stability to the photocathode during transport, use, and storage. In some embodiments, when the substrate includes a conductive layer on a non-conductive base layer where the conductive layer is applied as a thin film, the thickness of the conductive layer may be about 5 nm to about 250 nm, for example, about 10 nm to about 200 nm, or about 25 nm to about 150 nm. In some embodiments, when the substrate includes an adhesion layer, the adhesion layer may have a thickness of about 2 nm to about 25 nm; for example, about 5 nm to about 15 nm. In some embodiments, the substrate may include a base layer made of quartz and a conductive layer including Au with a thickness of about 25 nm to about 150 nm or about 50 nm to about 100 nm. In some embodiments, the substrate may include a base layer made of quartz, an adhesion layer including about 10 nm of Cr, and a conductive layer including about 200 nm of Au.

In some embodiments, the quantum confined nanostructures or QDs may be formed as a photoemission layer without an underlying substrate layer. For example, the thickness of the photoemission layer on its own may be large enough to have adequate or suitable mechanical stability, e.g., may act as its own substrate. In some embodiments, when the photoemission layer is formed without an underlying substrate layer, the thickness of the photoemission layer may be substantially similar to the thickness of the substrate layer described above. However, it will be understood that embodiments of the present disclosure are not limited thereto, and that those having ordinary skill in the art are capable of selecting a layer thickness and suitable methods of forming the layer, according to the principles described herein.

In some embodiments, the photocathode may further include plasmonic nanostructures to enhance performance. As used herein, the term "plasmonic nanoparticles" refers to nanoparticles in which quantum confinement of conduction band electrons results in resonance enhancement of coherent electronic oscillations (plasmons), which are generated within the particle upon excitation with electromagnetic radiation (e.g., light). The resulting buildup of an electromagnetic field produces a dipole field that increases the photonic absorption and scattering cross-sections of the particle, thereby enhancing light absorption and scattering. In some embodiments, the plasmonic nanostructures may be included in the photocathode by using a nanoscale engineered substrate. In some embodiments, plasmonic nanostructures may be included in the photocathode as plasmonic nanoparticles deposited on the substrate. The material for such plasmonic nanoparticles is not particularly limited as long as it exhibits surface plasmon resonance, and may include, for example, metal particles (e.g., Au, Ag, Cu, etc.) or metal compound particles (e.g., copper chalcogenide, copper halide, etc.). When plasmonic nanostructures are formed by depositing plasmonic nanoparticles on the substrate, the particles may be deposited using substantially the same methods used to deposit the quantum confined nanostructures, and may be deposited before, after, or along with the quantum confined nanostructures (e.g., as a separate layer or as a mixture with the quantum confined nanostructures).

In some embodiments, the photocathode may further include a nanostructured resonant tunneling transmission layer on the photoemission layer in order to further tune the emittance of the resultant emitted electron beam. The resonant tunneling transmission layer may have a superlattice structure (e.g., may be an ordered system having long-range periodicity and effectively forming a lattice of separated quantum wells). When electrons emitted by the photoemission layer pass through the resonant tunneling transmission layer and encounter the multiple tunneling barriers of the separated quantum wells, photoemission from the resonant tunneling transmission layer is permitted only at discrete energy levels corresponding to the quantum tunneling resonances. As used herein, the term "quantum tunneling" is used in its art-recognized sense to refer to the quantum mechanical phenomenon by which a particle on the quantum scale is able to move past an energy potential barrier. As a result, the resonant tunneling transmission layer further "filters" and restricts the energy distribution of the photoemitted electron beam, thus further decreasing its emittance without affecting the quantum efficiency.

The resonant tunneling transmission layer may have any suitable thickness. For example, in some embodiments, the resonant tunneling transmission layer may have a thickness of about 2 to about 20 atomic layers, and in some embodiments, about 2 to about 10 atomic layers.

The resonant tunneling transmission layer may be formed from any suitable material. For example, in some embodiments, the resonant tunneling transmission layer may include carbon graphene, white graphene (e.g., hexagonal boron nitride or h-BN), and/or similar materials forming a superlattice or having a two dimensional periodic structure. However, embodiments of the present disclosure are not limited thereto, and those having ordinary skill in the art are capable of identifying and selecting appropriate materials.

According to embodiments of the present disclosure, the photocathode described herein may be incorporated into a vacuum electronic device to thereby emit electrons within the device. For example, the photocathode may be paired with an anode and placed in a vacuum environment (e.g., vacuum chamber) so that a light source is positioned to emit light on the photocathode, and the electrons subsequently emitted by the photocathode may be collected by the anode. FIG. 1A is a schematic diagram of an example embodiment of a vacuum electronic device for testing photocathodes. As can be seen in FIG. 1A, a photocathode including a QD film deposited on an Au-coated glass substrate is placed near a Faraday cup (e.g., as the anode) in an optical-access vacuum chamber with two windows. The front face of the photocathode is biased at −20 keV via a stainless steel electrode directly contacting the QD film, and the photocathode is excited via pulsed laser excitation at a 20° angle to normal through an optical port of the vacuum chamber. The resulting $e^-$ beam (electron beam) is emitted toward the Faraday cup. However, embodiments of the present disclosure are not limited to the device of FIG. 1A. The vacuum electronic device of the present disclosure may be extrapolated to various suitable photoemission devices, for example, photomultipliers, particle accelerators, X-ray generators, etc., but embodiments of the present disclosure are not limited to these example devices.

In some embodiments of a vacuum electronic device including the photocathode of the present disclosure, a light source including one wavelength may be used to initiate photoemission of the valence band electrons. In some embodiments, the ionization potential (e.g., the "valence band" energy, or the energy required to excite an electron from the valence band to vacuum) of the quantum confined nanostructures may be tuned to match the energy of the light source (or an integer multiple of that energy) to thereby produce emitted electrons of nearly identical kinetic energies. However, the ionization potential of the quantum confined nanostructures and the wavelength of the light source are not particularly limited as long as the quantum confined nanostructures are able to absorb the light from the light source (e.g., the energy of the light source is equal to or larger than the band gap of the quantum confined nanostructures) and an excitation mechanism is available in which multiple excitons combine to yield sufficient energy for photoionization.

In some embodiments, the excitation energy may be tuned so that laser pulses further in the ultraviolet energy spectrum that match the ionization potential may be used, therefore reducing the order of the photoionization process to a single photon.

In some embodiments, the photocathodes according to embodiments of the present disclosure may photoemit via the generation of hot carriers, which may enable rapid cathode response times in the sub-picosecond range. Without being bound by any particular mechanism or theory, photoemission may occur via any suitable or operative mechanism. The mechanism may be direct or indirect. In some embodiments, photoemission may occur via resonant multiphoton absorption, in which a first photon absorbed by a QD leads to excitation of an electron from the valence band into the conduction band, and subsequent photons increase the energy of the electron within the conduction band until the electron has enough energy to overcome the energy barrier to vacuum. In some embodiments, photoemission may occur via Auger-assisted ionization, in which a single QD absorbs multiple photons to generate a multi-exciton, followed by Auger recombination events to convert the multi-exciton into a single exciton with energy in excess of the ionization potential. In some embodiments, photoemission may occur via simultaneous non-linear non-resonant four-photon absorption.

In some embodiments, the photocathodes according to embodiments of the present disclosure may exhibit carrier mobilities on the order of about $10^{-4}$ cm$^2$ V$^{-1}$ s$^{-1}$ to $10^{-6}$ cm$^2$ V$^{-1}$ S$^{-1}$1, for example, about $10^{-5}$ cm$^2$ V$^{-1}$ s$^{-1}$. In some embodiments, the QD films may be treated to produce higher carrier mobilities.

In some embodiments, two light sources may be used to achieve photoemission. The light sources may produce the same wavelength, or may each produce light having a different wavelength. In some embodiments, the first light source may be time-gated or may be a continuous wave, and the second light source may be time-gated, or "pulsed". The pulse width of the second light source may be chosen so as to achieve a suitable time-gating of the photoemitted electrons. The photocathode may be exposed to the sources simultaneously or serially (e.g., alternatingly, or one after another). The first source may excite electrons in the quantum confined nanostructure (e.g., QD) from the valence band to the conduction band, and the second source may initiate photoemission of the conduction band electrons (e.g., may excite electrons from the conduction band to vacuum). In this configuration, the quantum confined nanostructure may be selected so that: 1) the principal band gap is equal to or less than the energy of the first source; and 2) the electron affinity (e.g., the "conduction band" energy) of the quantum confined nanostructure is equal to the energy of the second source or to an integer multiple of that energy. Again, the intended outcome is emission of electrons of nearly identical kinetic energies. The ionization potential of the quantum confined nanostructures and the wavelengths of the light sources are not particularly limited as long as the first wavelength is equal to or larger than the band gap of the quantum confined nanostructure, and a excitation mechanism is available in which an exciton or multiple combined excitons yield sufficient energy for photoionization. The excitation mechanisms may be the same as described above.

The following examples and experimental data are provided for illustrative purposes only, and do not limit the scope of the embodiments of the present invention.

EXAMPLES

Methods of preparing the chemical precursors used to synthesize quantum confined nanostructures (e.g., QDs), the QDs, and films including the QDs are described in the publication by Makarov, N, et al., "Quantum dot thin-films as rugged, high-performance photocathodes", *Nano Letters*, 2017, 17(4), pgs. 2319-2327, the entire content of which is incorporated herein by reference. All chemicals were purchased from Alfa Aesar, Sigma-Aldrich, or Acros Organics and used as received without further purification. ITO-coated glass slides and glass substrates were obtained from Fisher Chemical.

A precursor solution of cadmium oleate (Cd(OA)$_2$) was prepared by reacting 10 mmol of cadmium oxide (CdO) with 10 mL of oleic acid (OA) and 10 mL of 1-octadecene (ODE) at 280° C. until the solution became colorless. Precursor solutions of 2 M n-trioctylphosphine selenium (TOPSe) and 2 M n-trioctylphosphine sulfur (TOPS) were prepared by mixing 10 mmol of selenium shot or 10 mmol sulfur powder, respectively, with 5 mL of n-trioctylphosphine (TOP) at room temperature overnight.

Example 1: CdSe QD Photocathode 0.8 mL of 2 M cadmium oleate (Cd(OA)$_2$) and 20 mL of 1-octadecene were placed into a 100 mL, 3-neck round-bottom flask. After degassing at 120° C. for 10 min and backfilling with N$_2$, the reaction temperature was elevated to 310° C. When the reaction temperature reached 300° C., 0.4 mL of 2 M trioctylphosphine selenite (TOPSe) was rapidly injected into the round-bottom flask. 4 mL of trioctylphosphine was added dropwise after 30 seconds to prevent immediate precipitation of the QDs. After 4 minutes, a mixture of 8 mL of 0.5 M Cd(OA)$_2$, 2 mL of 2 M TOPSe, and 6 mL of 1-octadecene was continuously added to the reactor over about 48 min (e.g., with a 20 mL/h injection rate). At the end of the injection, the reactor was rapidly quenched to room temperature. The as-prepared solution was further purified by precipitation/re-dispersion using a mixture of acetone and toluene. The precipitate was dried under N$_2$ for 5 min and re-dispersed in anhydrous octane at a concentration of 10 mg/mL, thereby completing the synthesis of the CdSe QDs.

The CdSe quantum dots had a mean radius of 3.8 nm, a band gap of 1.86 eV, and a valence band edge position at −6.69 eV (with respect to vacuum).

A quartz substrate as a base layer was ultrasonicated in isopropanol for 30 minutes and plasma-cleaned for 15 minutes. An adhesion layer including about 10 nm of Cr and a conductive layer including about 200 nm of Au were subsequently deposited by thermal evaporation of each metal under a $10^{-7}$ Torr vacuum.

A layer-by-layer deposition method was used to deposit the photoemissive layer. All fabrication was conducted under inert atmosphere to prevent degradation of QDs. The CdSe QD dispersion in octane was deposited on the conductive layer by spin-coating at 2000 rpm for 30 sec. The film was then fully immersed in a methanol solution of 50 mm NH$_4$I for 1 min to facilitate ligand exchange for I—. The remaining NH$_4$I solution was removed by spinning at 2000 rpm and washing three times with methanol to remove excess NH$_4$I in the film. The QD film formation/surface treatment/washing procedure was repeated 10 times to increase the film thickness up to about 1 micron. At the end of fabrication, the film was dried at 90° C. for 10 min to remove any residual solvent, thereby completing the manufacturing of the CdSe QD photocathode of Example 1. The final thickness of the photoemission layer was 120 nm.

Example 2: CdSe/CdS QD Core/Shell Heterostructure Photocathode

A portion of CdSe QDs roughly constituting 25% of the yield from the synthesis of Example 1 was dispersed in hexane, and this solution was mixed with 10 mL of n-trioctylamine in a flask and degassed at 120° C. for 10 min to remove hexane, oxygen, and water. After backfilling the flask with $N_2$, 2 mL of 2 M $Cd(OA)_2$ was added and the reaction temperature was increased to 300° C. When the temperature reached 280° C., 0.6 mmol of 1-dodecanethiol (DDT) was slowly added over 10 min and the temperature was maintained for 60 min to grow the CdS shell around the CdSe core. Similar results were obtained by adding $Cd(OA)_2$ and DDT periodically in 60 minute intervals to grow the CdS shell stepwise: 2 mL of $Cd(OA)_2$ and 1 mmol of DDT; 3 mL of $Cd(OA)_2$ and 1.5 mmol of DDT; 4 mL of $Cd(OA)_2$ and 2 mmol of DDT; 5 mL of $Cd(OA)_2$ and 2.5 mmol of DDT. At the end of the reaction, the reactor was quenched to room temperature and purified four times by precipitation/re-dispersion using ethanol and hexane. The precipitate was dried under air for 5 min and dispersed in octane at a concentration of 40 mg/mL, thereby completing the synthesis of the QDs.

The CdSe/CdS core/shell quantum dots retained a mean core radius of 3.8 nm, a band gap of 1.86 eV, and a valence band edge position at −6.69 eV (with respect to vacuum).

The CdSe/CdS core/shell QD photocathode of Example 2 was prepared according to substantially the same method described for the Cd/Se QD photocathode of Example 1. The final thickness of the photoemission layer was 80 nm.

Example 3: ZnS QD Photocathode 2 mmol of zinc acetate $(Zn(ac)_2)$, 2 mL of oleic acid, and 3 mL of 1-octadecene were reacted at 120° C. for 30 min under vacuum to prepare zinc oleate. After the temperature was increased to 300° C., 1.5 mL of 2 M trioctylphosphine sulfide (TOPS) was swiftly injected and reacted for 10 min. The reaction was terminated and the as-prepared solution was purified three times using ethanol and toluene. The final precipitate was dried under air for 5 minutes and re-dispersed in octane at a concentration of 10 mg/mL, thereby completing the synthesis of the QDs.

The ZnS quantum dots had a mean radius of 6 nm, a band gap of 3.7 eV, and a valence band edge position at −7.3 eV (with respect to vacuum).

The ZnS core/shell QD photocathode of Example 3 was prepared according to substantially the same method described for the Cd/Se QD photocathode of Example 1. The final thickness of the photoemission layer was 100 nm.

Example 4: PbSe QD Photocathode 8 mmol of $PbBr_2$, 8 mL of oleylamine (OLA), and 16 mL of 1-octadecene were mixed in a 100 mL, three-neck flask and degassed at 120° C. for 20 minutes until the solution became clear. The temperature was raised to 180° C. and a mixture of 2 mL OLA, 1 mL of 2 M TOPSe, and 0.1 mL di-isobutylphosphine was injected into the flask. The reaction was quenched by removing the heating mantle after injection. The reaction was cooled to room temperature and PbSe QDs were precipitated by adding 30 mL of chloroform and 10 mL of acetonitrile. The precipitate was isolated and 10 mL of hexane was added to dissolve the PbSe QD component, thus forming a slurry solution. The slurry solution containing unreacted lead precursor was centrifuged to isolate the PbSe QDs in the supernatant. The PbSe QDs were purified one more time via re-precipitation in 20 mL chloroform and 10 mL acetonitrile and finally dissolved in hexane for ligand exchange.

$NH_4I$ powder was dissolved in 10 mL DMF to obtain a solution with a concentration of 50 mg/mL, which was subsequently mixed with the PbSe hexane solution (10 mL, 50 mg/mL) in a 50 mL centrifuge tube to form a double-layer (e.g., of hexane on DMF). The tube was shaken vigorously for 5 seconds so that the PbSe QDs were transferred from the top non-polar phase (hexane) to the bottom polar phase (DMF), and were then precipitated out of the polar phase by addition of 10 mL toluene. The precipitated PbSe QDs were washed one more time by re-dissolving in 10 mL of DMF and 10 mL of chloroform and finally dissolved in 2,6-difluoropyridine at a concentration of about 100 mg/mL, thereby completing the synthesis of $NH_4I$-treated PbSe QDs.

The PbSe quantum dots had a mean radius of 2.5 nm, a band gap of 0.816 eV, and a valence band edge position at −5.02 eV (with respect to vacuum).

The PbSe core/shell QD photocathode of Example 4 was prepared according to substantially the same method described for the Cd/Se QD photocathode of Example 1, except that the QD thin film was not treated with $NH_4I$ after each spin-coating deposition. The final thickness of the photoemission layer was 450 nm.

Examples 5-7: Field Effect Transistor Measurements $p^{++}$ silicon substrates with 300 nm of $SiO_2$ were cleaned by sonication in isopropanol for 30 min, and dried at 120° C. for 10 min. QD films including CdSe, CdSe/CdS, and ZnS were deposited to a thickness of 50 nm on the $SiO_2$ using substantially the same methods described in Examples 1 to 3. The samples were then dried at 120° C. under $N_2$ for 30 min to remove residual solvent. Aluminum source and drain electrodes separated by a 100 μm channel were deposited over each QD film using thermal evaporation at $10^{-7}$ Torr, thereby forming a field effect transistor (FET). The electrical properties of each FET were measured using a semiconductor analyzer (Agilent B1500A, Santa Clara, Calif.).

Comparative Example 1: CdSe QD Photocathode without Au

A CdSe QD photocathode was generally prepared according to the method of preparing the CdSe QD photocathode described in Example 1, except that the substrate was not coated with gold prior to deposition of the QD thin film.

Comparative Example 2: CdSe/CdS QD Core/Shell Photocathode without Au

A CdSe/CdS core/shell QD photocathode was generally prepared according to the method of preparing the CdSe/CdS core/shell QD photocathode described in Example 2, except that the substrate was not coated with gold prior to deposition of the QD thin film.

Comparative Example 3: ZnS QD Photocathode without Au

A ZnS QD photocathode was generally prepared according to the method of preparing the ZnS core/shell QD photocathode described in Example 3, except that the substrate was not coated with gold prior to deposition of the QD thin film.

Comparative Example 4: PbSe QD Photocathode without Au

A PbSe QD photocathode was generally prepared according to the method of preparing the PbSe core/shell QD photocathode described in Example 2, except that the substrate was not coated with gold prior to deposition of the QD thin film.

Comparative Example 5: Au-Coated Glass

Comparative Example 5, consisting of an Au-coated glass substrate (e.g., having no QD photoemissive layer) was prepared by ultrasonicating a quartz substrate in isopropanol for 30 minutes and plasma-cleaning for 15 minutes. An adhesion layer including 10 nm of Cr and a conductive layer including 200 nm of Au were subsequently deposited by thermal evaporation of each metal under a $10^{-7}$ Torr vacuum.

Comparative Example 6: Cu Photocathode

A conventional Cu bulk photocathode having a thickness of 100 microns was obtained from MTI Corporation and used as Comparative Example 6. The photocathode was cleaned in vacuo by UV laser exposure prior to each use.

Comparative Example 7: CdSe QD Photocathode without Ligand Exchange

A CdSe QD photocathode was generally prepared according to the method of preparing the CdSe QD photocathode described in Example 1, except that the $NH_4I$ ligand exchange treatment was not carried out on the QDs.
Photoemission from QD Photocathodes FIG. 1A is a schematic diagram illustrating an experimental setup for testing electron photoemission from quantum dot (QD) photocathodes, according to embodiments of the present disclosure. A photocathode including a solid solution cast QD film deposited on an Au-coated glass substrate is excited via pulsed laser excitation at a 20° angle to normal through an optical port of the vacuum chamber. The cathode is kept at −20 kV bias to facilitate collection of photoelectrons (e-beam) into a Faraday cup, where the photocurrent is measured by a Keithley 6517B electrometer (e.g., picoammeter Ⓐ).

Figure 1B:
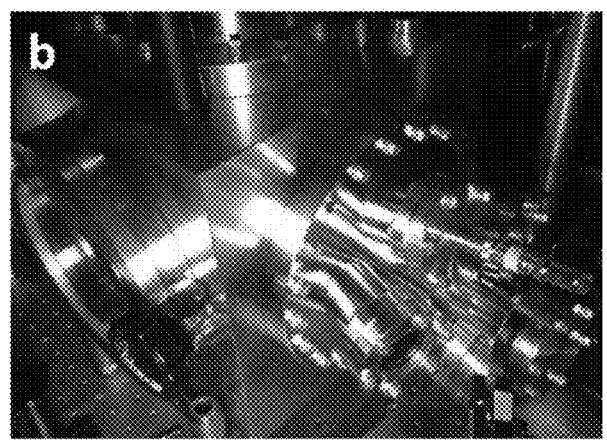
FIGS. 1B-1D are photographic images of the overall sample chamber, a side view of the photocathode through the optical port, and a front view of the photocathode, respectively, as depicted in FIG. 1A.
Figure 1C:
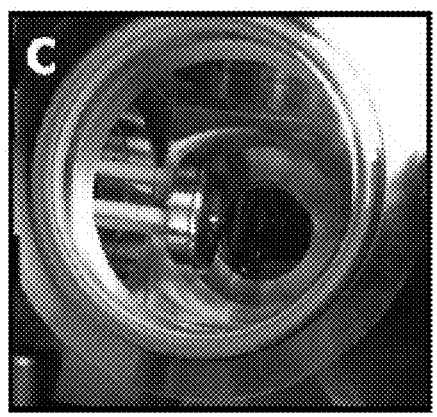
Figure 1D:
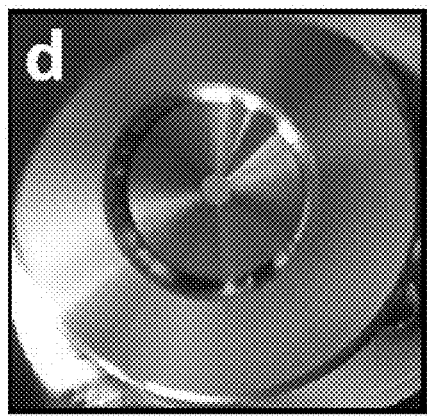

FIGS. 1B-1D are photographic images of the overall sample chamber, a side view of the photocathode through the optical port, and a front view of the photocathode as seen inside the chamber, respectively, as described in FIG. 1A. FIG. 1B shows an overview of the vacuum chamber used to house the QD photocathode with the optical port on the left side of the chamber photograph. FIGS. 1C-1D show that the front electrode includes a circular aperture having a 6.4 mm diameter surrounded by a washer-shaped electron lens that provides rough collimation of the emitted electron beam.

In all experiments, the vacuum chamber was evacuated to a pressure of $10^{-8}$ mbar prior to testing. The light used for pulsed laser excitation was generated by a 1 kHz repetition rate amplified femtosecond Ti:sapphire laser at wavelengths of 800 nm, 400 nm, and 266 nm, corresponding to the fundamental, second, and third harmonics, respectively, of the light source. These wavelengths correspond to photon energies of 1.55 eV (800 nm), 3.1 eV (400 nm), and 4.66 eV (266 nm). The excitation was slightly focused on the QD film to a diameter of about 1.5-2 mm. An uncoated continuously-variable neutral density filter was used to control the excitation power.

Figure 2:
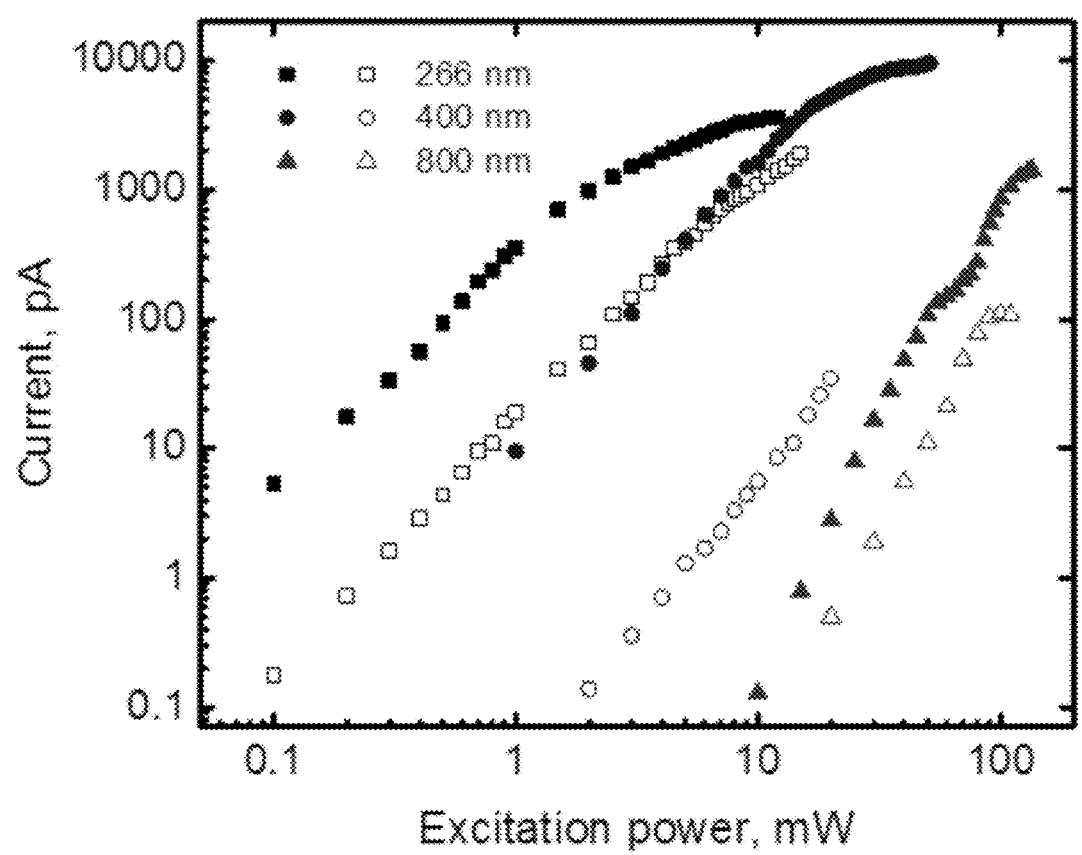
FIG. 2 is a log-log plot of the electron photoemission current (e.g., photocurrent) produced by a PbSe QD film photocathode (solid markers) according to embodiments of the present disclosure, compared to a bare Au-coated glass substrate (empty markers), as a function of excitation power (in mW) using light at 266 nm (squares), 400 nm (circles), and 800 nm (triangles)

First, the PbSe QD photocathode of Example 4 was tested for photocurrent generation. FIG. 2 is a log-log plot comparing the electron photoemission currents (e.g., photocurrent) produced by the PbSe QD photocathode of Example 4 (solid markers) and the bare Au-coated substrate of Comparative Example 5 (empty markers) as a function of excitation power (in mW) with light at 266 nm (squares), 400 nm (circles), and 800 nm (triangles). The PbSe QD photocathode exhibited an increase over the baseline photocurrent produced by excitation of the bare Au-coated glass at all three excitation wavelengths. However, the net contribution of the Au-coated glass substrate to the total photocurrent in the QD thin film photocathodes should be even less than that measured for the bare Au-coated glass control. This is because the QD layer should reduce the amount of excitation power that reaches the gold substrate to 25% or less, even at the most highly transmitting (e.g., penetrating) wavelength of 800 nm. FIG. 2 shows that photocurrents as high as 1 nA can be achieved using 800 nm excitation (about 100 mW excitation power), whereas higher energy photons can produce up to 2-10 nA of current at 10-50 mW. The experimental trends are highly reproducible, particularly under 400 nm and 266 nm excitation where nearly all photons are absorbed by the PbSe film.

The photocurrent exhibited superlinear growth with excitation power, followed by saturation at high excitation powers in each measurement. Photocurrents as high as 1-10 nA (1000-10000 pA) were achieved at modest excitation powers of 10-100 mW using all three excitation wavelengths.

The valence band edge position of the PbSe QDs is at about −5.02 eV with respect to vacuum. As such, energy conservation principles suggest that a single photon having an energy of about 4.66 eV or less (e.g., as corresponding to a wavelength of about 266 nm or greater) is insufficient to overcome the energy barrier, and therefore cannot directly induce photoemission. Consequently, at least 2-4 photons must be involved for each electron emission event from the PbSe QDs, depending on the excitation wavelength used.

Figure 3:
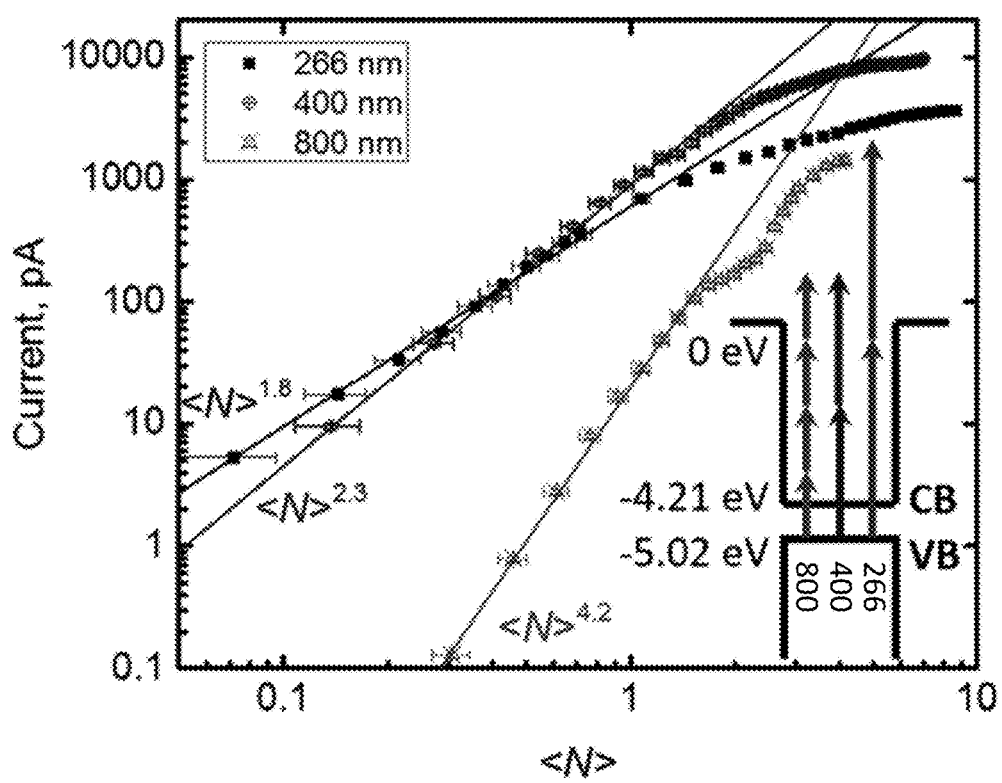
FIG. 3 is a log-log plot showing the relationship between <N> and photocurrent for excitation of the PbSe QD photocathode of Example 4 using light at 266 nm (squares), 400 nm (circles), and 800 nm (triangles). The inset on the right side of FIG. 3 is an energy diagram comparing the additive energies of 2 to 4 of each of the incoming 266 nm, 400 nm, or 800 nm photons with the band gap of the PbSe QD film photocathode.

To gain better insight into the mechanism of photoemission, it is instructive to replot the photocurrent data in FIG. 2 as a function of the average number of absorbed photons per laser pulse denoted by $\langle N \rangle$. $\langle N \rangle$ can be calculated for each emission wavelength from the expression $\langle N \rangle = \sigma j$, where $\sigma$ is the absorption cross section of the QDs at the excitation wavelength and j is the number of photons per pulse per unit area as determined by the spot size of the excitation beam (e.g., the laser fluence, as correlated with the excitation power in mW). FIG. 3 is a log-log plot showing the relationship between <N> and photocurrent for excitation of the PbSe QD photocathode of Example 4 at about 266 nm (squares), about 400 nm (circles), and about 800 nm (triangles). The inset on the right side of FIG. 3 is an energy diagram comparing the energies of the incoming photons with the band gap of the PbSe QDs.

At relatively low laser fluences j corresponding to $\langle N \rangle \leq 1$ (e.g., on the left side of FIG. 3), the photocurrent (I) increases according to a power law of the form $I = \langle N \rangle^x$, where x yields the average number of photons required to generate a single electron by photoemission. At least about 5.0 eV of energy is needed to excite a valence band electron to the vacuum level in the PbSe QD photocathode of Example 4, which can be supplied by two photons at 4.66 eV (800 nm) or 3.1 eV (400 nm), or four photons at 1.55 eV (266 nm), assuming conservation of energy and as pictorially shown in the energy diagram of FIG. 3. Indeed, these rough estimates are in good agreement with the values extracted from the power law fits (solid straight lines in FIG. 3), yielding x=1.8, 2.3, and 4.2 for the 4.66, 3.1, and 1.55 eV excitation photon energies, respectively. At higher excitation fluences at which $\langle N \rangle > 1$ (e.g., on the right side of FIG. 3), the photocurrent appears to saturate, which may be the result of charge depletion within the excitation volume of the QD film.

Figure 4:
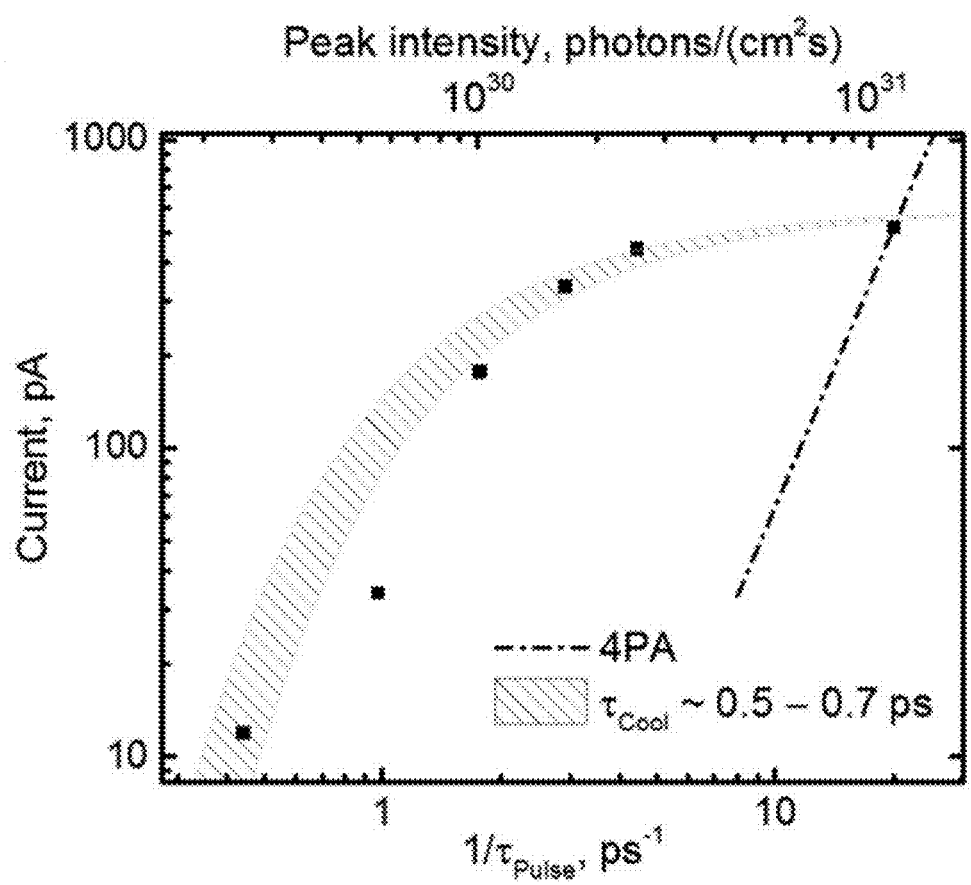
FIG. 4 is a log-log plot showing the relationship between photoemission current and the reciprocal of the pulse width ($1/\tau_{pulse}$), as well as the relationship between photoemission current and peak laser intensity (photons per $cm^2 s$)

Although resonant multiphoton absorption by an electron has been invoked to explain QD photoemission in the related art, alternative mechanisms should be considered as well. Pulse-width-dependent photocurrent measurements were used to estimate the allowed time window for photoexcitation to result in emission as a test of consistency with alternative mechanisms. In these measurements, the PbSe QD photocathode of Example 4 was excited by a laser at 1.55 eV (266 nm) and the pulse width ($\tau_{pulse}$) was varied over about 50 fs to about 2200 fs while keeping the average power constant at 90 mW, which corresponds to $\langle N \rangle \approx 2.7$. The maximum time window of the multiphoton absorption process that still results in significant photocurrent can be measured as the maximum $\tau_{pulse}$. FIG. 4 is a log-log plot showing the relationship between photoemission current and the reciprocal of the pulse width ($1/\tau_{pulse}$), as well as the relationship between photoemission current and peak laser intensity (photons per cm²s). FIG. 4 shows an exponential dependence of the cathode current on $\tau_{pulse}$, which is consistent with an absorption lifetime in the 0.5 ps to 0.7 ps range, shown by the hashed shaded area of FIG. 4. This timescale appears to be consistent with sub-picosecond-to-picosecond hot electron cooling via electron-phonon coupling phenomena, which has been previously measured for PbSe QDs, and suggests the involvement of hot carriers that have yet to relax to the band edge. The result is consistent with FIG. 3 in that excitation at 1.55 eV (266 nm) is shown to use a four-photon excitation process.

Simultaneous non-linear non-resonant four-photon absorption can be excluded as a potential mechanism on the basis of the mismatch between its expected $1/\tau_{pulse}$ dependence (dash-dotted line "4PA" in FIG. 4) and the measurements. The four-photon excitation process is consistent with resonant multiphoton absorption as well as Auger-assisted ionization, as both of these processes require the participation of hot electrons in order to reach (or exceed) the ionization potential with only four 1.55 eV photons. The relative probabilities of these two mechanisms were thus calculated and compared to the measured photon-to-electron quantum efficiencies in order to identify the more likely mechanism.

In the case of resonant (via real intermediate states) multiphoton absorption, the first photon absorbed by a QD leads to interband excitation of an electron from the valence band into the conduction band, while the three subsequent photons increase the energy of the electron within the conduction band via intraband absorption. The probability of this multiphoton process can be estimated from the QD absorption cross section a and the laser fluence j. The interband absorption cross section a of the PbSe QDs at the excitation wavelength of 1.55 eV (266 nm) is about $1.2 \times 10^{-15}$ cm². In contrast to bulk semiconductors, in which intraband absorption is suppressed by crystal momentum conservation, QDs have essentially wavelength-independent conduction band absorption cross sections on the order of $10^{-17}$ cm² (e.g., only about two orders of magnitude lower than the interband cross section). Assuming a negligible dependence of the intraband cross section on photon energy and absolute energy of the electron within the conduction band, the probability of resonant four-photon absorption can be calculated using Poissonian statistics and the above two cross section values to be about $2 \times 10^{-6}$ under a constant laser fluence of $2.3 \times 10^{15}$ cm⁻², independent of the pulse width. This value is larger than, and therefore consistent with the measured photon-to-electron quantum efficiency of about $10^{-8}$ for this four photon scenario, as other inefficiencies (such as coupling of intrinsic QD electronic states to vacuum states and/or various losses in charge collection) are likely to decrease the measured value.

The probability of Auger-assisted ionization was estimated as the probability of a single QD absorbing four 1.55 eV photons via interband absorption to generate four "hot" conduction band electrons (e.g., a tetraexciton), followed by Auger recombination events (e.g., conversion of the tetraexciton into intermediate triexciton and biexciton states before resulting in a single exciton with energy in excess of the ionization potential), all within the measured 0.5 ps to 0.7 ps hot electron lifetime. The biexciton, triexciton, and tetraexciton lifetimes were taken to be $\tau_{2X}=50$ ps, $\tau_{3X}=13$ ps, and $\tau_{4X}=5$ ps, respectively, for PbSe QDs. With a laser fluence of $2.3 \times 10^{15}$ cm⁻² and an interband absorption cross section of about $1.2 \times 10^{-15}$ cm², the probability of Poissonian tetraexciton generation was calculated to be about 0.15. This probability was multiplied by the probability of triexciton, triexciton, and biexciton decay within the 0.5 ps time window to obtain a probability of about $4 \times 10^{-6}$, a value very similar to the probability of resonant four photon absorption derived above. Therefore, both mechanisms appear feasible, and distinguishing between them would require a more detailed model and thorough investigations of intraband relaxation in QDs as a function of excess carrier energy. Regardless of the mechanism, however, the reliance on hot carriers ensures a rapid cathode response time comparable to intraband carrier cooling lifetimes, and therefore in the sub-picosecond range.

In FIG. 4, the photocurrent essentially vanishes for pulse widths above 2 ps, suggesting that 2 ps is an approximate upper bound for the duration of the photoemission process in an individual QD. However, the duration of the photoemission process in an individual QD is only a starting point in determining the response speed of an electron beam produced by a quantum confined photocathode. For example, the response speed may depend on other factors such as film thickness, surface roughness, absorption depth of photons, and various elastic and inelastic electron scattering processes.

One advantage of using QDs for cathode applications is the wide variety of available material compositions and their associated electronic structures. To illustrate some of the possibilities afforded by multi-component heterostructures, CdSe/CdS core/shell heterostructure QDs were compared to monocomponent CdSe QDs. The CdSe/CdS core/shell heterostructure QDs feature a quasi-type-II band alignment that promotes the spatial separation of electrons from holes via a reduction in wave function overlap. The term "quasi-type-II band alignment" is used herein in its art-recognized sense to refer to the relative band energy levels of two materials combined at a heterojunction, where "type II" indicates that the valence and conduction bands of a first material are each higher in energy than the valence and conduction bands, respectively, of a second material, and the conduction band of the second material is higher in energy than the valence band of the first material. The term "heterojunction" is used in its art-recognized sense to refer to an interface between two layers or regions of semiconductors having different band gaps. Removing electrons from these core/shell heterostructures should be more efficient than removing electrons from core-only (monocomponent) CdSe QDs, due to reduced electron-hole Coulomb interactions in this quasi-type-II band alignment structure. However, embodiments of the present disclosure are not limited thereto, and other electronic structures are possible.

Figure 5:
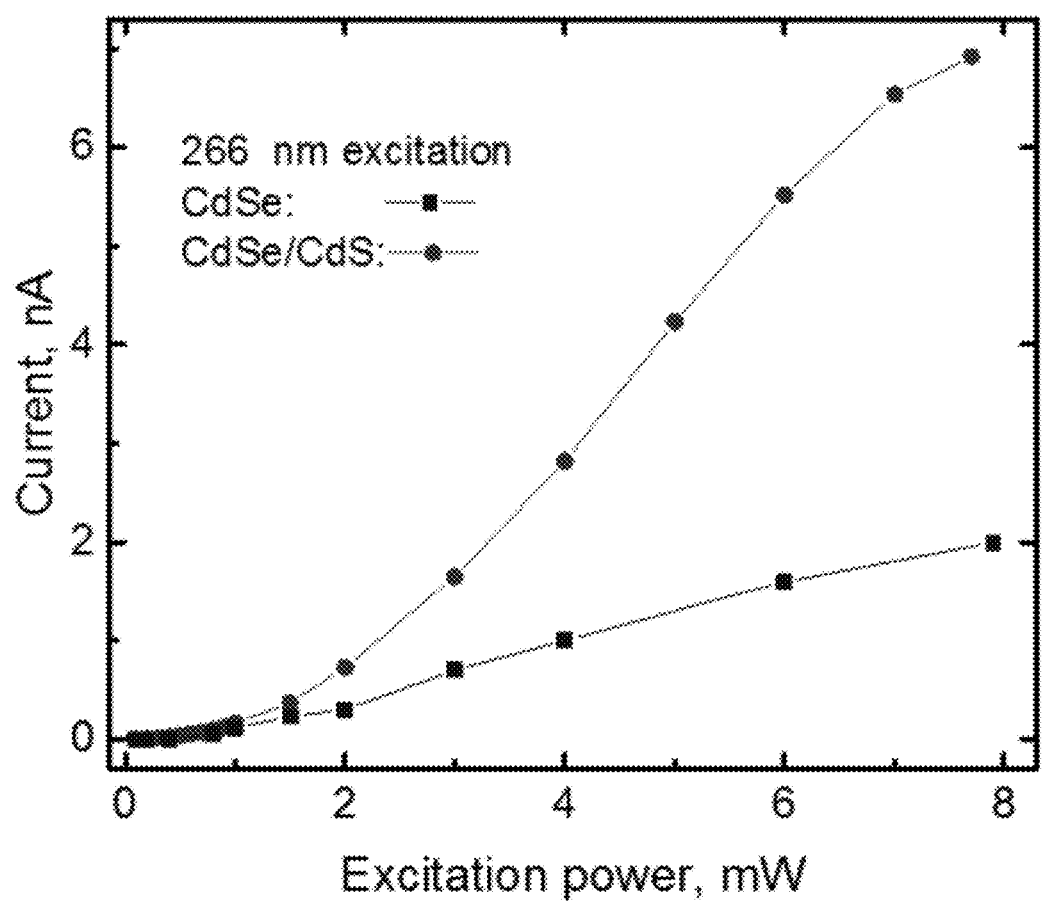
FIG. 5 is a graph comparing the photocurrents produced by CdSe (circles) and CdSe/CdS core/shell (squares) QD photocathodes according to embodiments of the present disclosure as a function of excitation power (in mW) with light at 266 nm. The photocurrent produced by the CdSe/CdS core/shell QD photocathode is larger than the photocurrent produced by the single-component CdSe QD photocathode by a factor of 3 or more at the maximum excitation intensity of 8 mW.

FIG. 5 is a graph comparing the photocurrents produced by the CdSe QD photocathode of Example 1 (squares) and the CdSe/CdS core/shell QD photocathode of Example 2 (circles) as a function of excitation power (in mW) with light at 266 nm (4.66 eV). As the top of the valence band for both sets of QDs is about 6.7 eV below the vacuum level, two 4.66 eV photons are required for the generation of each photoelectron. The photocurrent produced by the CdSe/CdS core/shell QD photocathode of Example 2 was larger than that produced by the single-component CdSe QD photocathode of Example 1 by a factor of more than 3 (to 6.9 nA) at the maximum excitation intensity of 7.7-7.9 mW. More sophisticated approaches, such as the use of aligned films of type-II or quasi-type-II dot-in-rod nanoscale heterostructures, or Janus-type heterostructures may potentially further boost photocathode performances.

Figure 6:
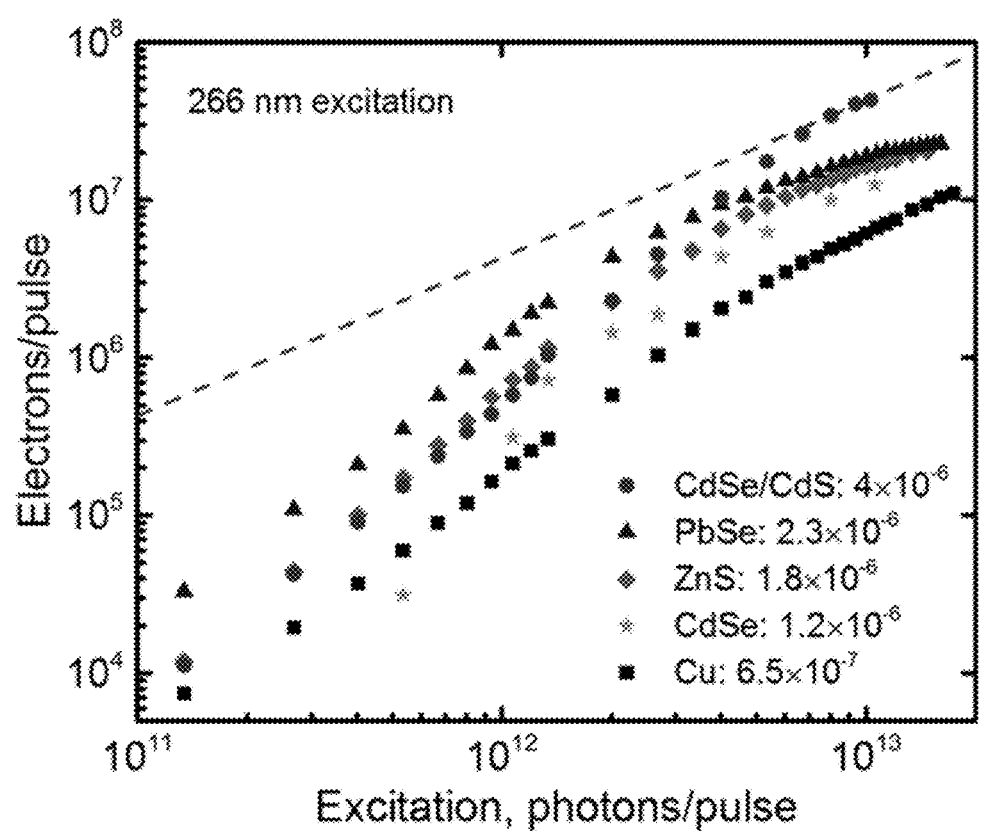
FIG. 6 is a log-log plot comparing the photoemission quantum efficiencies of QD photocathodes including CdSe/CdS (circles), PbSe (triangles), ZnS (diamonds), and CdSe (stars), respectively, according to embodiments of the present disclosure, as well as a conventional bulk copper photocathode (black squares) under identical excitation conditions. The peak quantum efficiencies were calculated for CdSe/CdS ($4\times10^{-6}$), PbSe ($2.3\times10^{-6}$), ZnS ($1.8\times10^{-6}$), CdSe ($1.2\times10^{-6}$), and Cu ($6.5\times10^{-7}$). The dashed guide line intersecting with the maximum measured quantum efficiency of CdSe/CdS quantum dots at $4\times10^{-6}$ corresponds to a linear photoelectron/pulse dependence having a unity slope and is provided for comparison.

The efficiencies of the QD-based photocathodes can be quantified and compared by plotting the number of electrons versus the number of photons per laser pulse. FIG. 6 is a graph comparing the photoemission quantum efficiencies of the CdSe/CdS QD photocathode of Example 2 (circles), the PbSe QD photocathode of Example 4 (triangles), the ZnS QD photocathode of Example 3 (diamonds), and the CdSe QD photocathode of Example 1 (stars), respectively, as well as the conventional bulk copper photocathode of Comparative Example 6 (squares) under identical excitation conditions ($10^{-8}$ mbar, 266 nm, 4.66 eV excitation, −20 kV acceleration voltage). The peak quantum efficiencies were calculated for each photocathode, and are listed in order of largest to smallest as CdSe/CdS ($4\times10^{-6}$%), PbSe ($2.3\times10^{-6}$%), ZnS ($1.8\times10^{-6}$%), CdSe ($1.2\times10^{-6}$%), and Cu ($6.5\times10^{-7}$%). The dashed guide line intersecting with the maximum measured quantum efficiency of CdSe/CdS quantum dots at $4\times10^{-6}$ corresponds to a linear photoelectron/pulse dependence having a unity slope, and is provided for comparison to the measured photoelectron/pulse trends for the QDs. All four QD photocathodes exhibited quantum efficiencies exceeding that of the conventional Cu photocathode of Comparative Example 6.

Although these quantum efficiencies are several orders of magnitude lower than those of the best performing bulk semiconductor thin film cathodes (such as $K_2CsSb$ or "negative electron affinity" GaAs), it should be noted that the QD photocathodes were handled in air and thereby exposed to oxygen and water vapor during loading into the chamber. In contrast, the efficiencies of the bulk semiconductor cathodes are known to degrade dramatically within hours even under vacuum conditions of $10^{-10}$ mbar, due to trace gas contamination, water vapor, and stray ion bombardment. For example, exposure to a water vapor partial pressure of about 1 Torr would be expected to instantaneously "kill" or inactivate a bulk semiconductor photocathode, which sensitivity is generally accepted as a universal limitation of bulk semiconductor photocathodes. In contrast, the QD thin film photocathodes showed no deterioration in performance after being stored for several weeks in the $10^{-8}$ mbar vacuum chamber. Further, the QD thin film photocathodes showed only a 55% drop in QE performance even after being stored in air for two months.

FIG. 6 shows that the quantum efficiencies (QEs) of the QD films increase with photoexcitation intensity in the low power regime (e.g., the slopes of the curves are higher than unity in that region, as can be seen in comparison to the unity-slope dashed line). The QEs appear to saturate at high excitation powers, and become constant or decline slightly (e.g., to a value less than unity).

The highest extracted steady-state current of about 10 nA (as shown in FIG. 2) corresponds to a photocathode charge on the order of 10 pC per bunch (e.g., pulse) and/or a photocathode peak current of 160 A/cm$^2$ (assuming a pulse width of 2 ps), which is on par with the requirements of photocathodes in the related art and exceeds the requirements for emerging applications such as ultrafast electron diffraction (UED). The "roll-off" in emitted current as a function of laser power may be due to space-charge effects, which can effectively prevent or reduce emission of photoionized electrons from the film if the extracted charge per bunch is sufficiently high. When the emission time is on the order of 2 ps (e.g., based on the pulse width), the electric field associated with a 10 pC per bunch charge can be calculated to be 0.35 MV/m, which is more than three times the applied extraction field of 0.1 MV/m. Under the present experimental conditions, space charge limiting occurs when the bunch charge approaches 2-3 pC. However, space-charge effects are associated with all cathode compositions and are not a specific limitation of photocathodes according to embodiments of the present disclosure. Elimination of such space-charge effects will require modification of the experimental apparatus (e.g., higher accelerating voltage and/or shorter collection distance).

Electron depletion may be an additional current-limiting factor. For example, measurements of the photocathode according to Comparative Example 7 showed unstable behavior. For example, when the photocathode according to Comparative Example 7 was irradiated at moderate to high excitation power, the photocurrent was observed to diminish with continuous exposure to the laser over a period of seconds, typically stabilizing at a value up to an order of magnitude lower than the initial value. The initial value was recovered and the decline was repeated after several minutes without illumination, which suggests that the decline in current is not due to permanent film damage.

Figure 7:
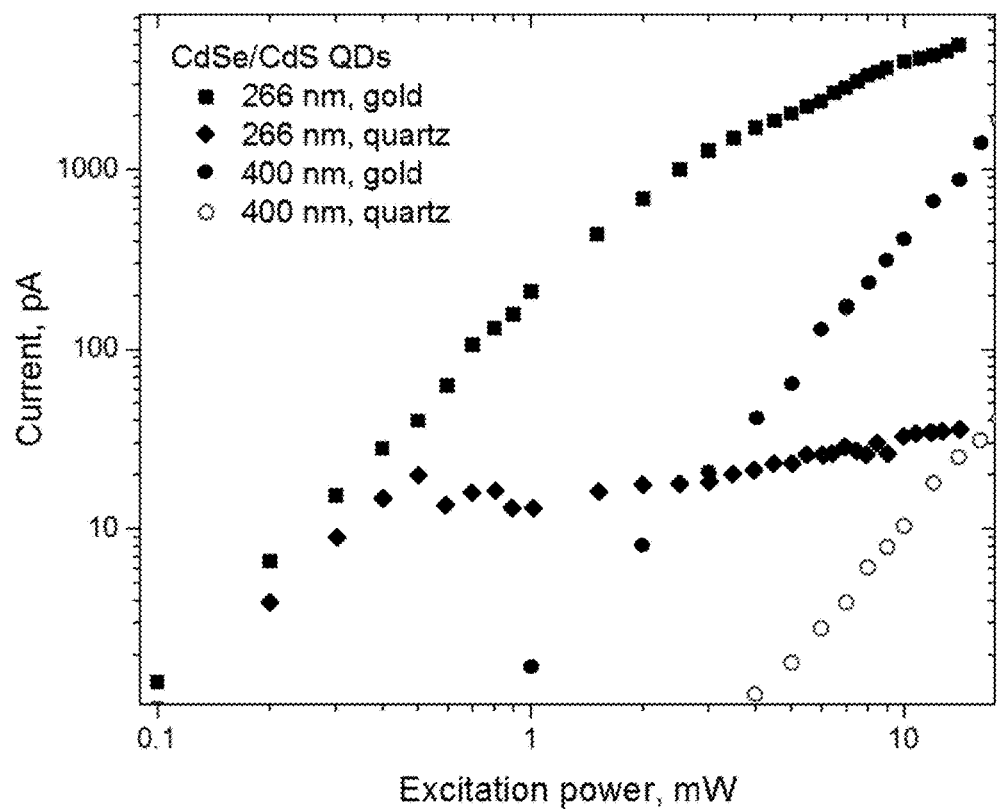
FIG. 7 is a log-log plot comparing the relationship between current and excitation power for CdSe/CdS core/shell heterostructured QDs on gold-coated quartz at 266 nm (squares), uncoated quartz at 266 nm (diamonds), gold-coated quartz at 400 nm (solid circles), and uncoated quartz at 400 nm (empty circles).

Furthermore, the QD films deposited directly onto a quartz substrate without a conductive layer of gold (e.g., Comparative Examples 1 to 4) showed much more dramatic current saturation effects (at high photon energies and shorter wavelengths, where excitation depth is shallower), and/or overall lower currents (at lower photon energies and longer wavelengths). FIG. 7 is a log-log plot comparing the relationship between current and excitation power for the CdSe/CdS core/shell heterostructured QDs on gold-coated quartz at 266 nm (squares), uncoated quartz at 266 nm (diamonds), gold-coated quartz at 400 nm (solid circles), and uncoated quartz at 400 nm (empty circles) (e.g., Example 2 and Comparative Example 2). This suggests that the presence of the conductive layer aids in replenishing emitted electrons, despite not being in direct contact with the front electrode. Without being bound by the correctness of any mechanism or theory, it is hypothesized that the conductive layer decreases the required travel distance of electrons through the QD film. For example, in the absence of a conductive layer, the electron may travel laterally from the front electrode aperture edge to the excitation spot for a travel distance of several millimeters. In contrast, in the presence of a conductive layer, the electron may travel through the thickness of the film for a travel distance of hundreds of nanometers. Other possibilities include alteration of the carrier density distribution in the QD film via formation of a junction at the metal-semiconductor interface.

Field-effect transistor measurements were used to measure the carrier mobilities of the QD photocathode films according to Examples 5 to 8. The films exhibited carrier mobilities on the order of $10^{-5}$ cm$^2$ V$^{-1}$s$^{-1}$, independent of QD composition. Without being bound by the correctness of any mechanism or theory, it is hypothesized that the carrier mobilities may be negatively impacted by electron depletion effects.

Given the role of hot electrons in the photoemission process, the use of QDs with slow hot-electron cooling rates may result in improved photocathodes, according to embodiments of the present disclosure. Further, when Auger ionization is the dominant mechanism, the use of QDs with enhanced Coulomb interactions may also result in improved photocathodes, according to embodiments of the present disclosure. In addition, the selection of QDs with ionization potentials (i.e., valence band positions) that are an integer multiple of the excitation photon energy, which can be accomplished by careful choice of QD composition and size, may result in improved or enhanced QEs, according to embodiments of the present disclosure.

As discussed herein and suggested by these Examples, the photocurrent produced by photocathodes according to embodiments of the present disclosure may be enhanced by band gap tuning to reduce the order of the photoionization process to 1 photon. In addition, the QD films may be treated to produce higher carrier mobilities. Finally, the enhanced current afforded by the heterostructured CdSe/CdS core/shell QDs as compared to the CdSe QDs suggests that structures with reduced electron-hole interaction strength, including the type-II heterostructures described herein, and/or shape-controlled nanoparticles that may feature enhanced "leakage" of the evanescent electron wave function in particular directions, may be used in improved photocathodes, according to embodiments of the present disclosure.

In summary, the present disclosure provides a photocathode having high quantum efficiency (QE), low emittance, fast response time to incident light pulse, long operational lifetimes, and increased environmental stability compared with photocathodes and cathodes in vacuum electronic devices of the related art.

While certain exemplary embodiments of the present disclosure have been illustrated and described, those having ordinary skill in the art will recognize that various changes and modifications can be made to the described embodiments without departing from the spirit and scope of the present invention, and equivalents thereof, as defined in the claims that follow this description. For example, although certain components may have been described in the singular, i.e., "a" quantum dot, "a" ligand, and the like, one or more of these components in any combination can be used according to the present disclosure.

Also, although certain embodiments have been described as "comprising" or "including" the specified components, embodiments "consisting essentially of" or "consisting of" the listed components are also within the scope of this disclosure. For example, while embodiments of the present invention are described as comprising exciting a photocathode with a light source to emit electrons, and collecting the electrons with an anode, embodiments consisting essentially of or consisting of these actions are also within the scope of this disclosure. Accordingly, a method of generating an electron beam may consist essentially of exciting a photocathode with a light source to emit electrons, and collecting the electrons with an anode. In this context, "consisting essentially of" means that any additional components or process actions will not materially affect the outcome produced by the method.

As used herein, unless otherwise expressly specified, all numbers such as those expressing values, ranges, amounts or percentages may be read as if prefaced by the word "about," even if the term does not expressly appear. Further, the word "about" is used as a term of approximation, and not as a term of degree, and reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure may describe "a" quantum dot or "a" ligand, a mixture of such materials or ligands can be used. When ranges are given, any endpoints of those ranges and/or numbers within those ranges can be combined within the scope of the present disclosure. The terms "including" and like terms mean "including but not limited to," unless specified to the contrary.

Notwithstanding that the numerical ranges and parameters set forth herein may be approximations, numerical values set forth in the Examples are reported as precisely as is practical. Any numerical value, however, inherently contains certain errors necessarily resulting from the standard variation found in their respective testing measurements. The word "comprising" and variations thereof as used in this description and in the claims do not limit the disclosure to exclude any variants or additions.

What is claimed is:

1. A tunable photocathode capable of being tailored to emit an electron beam with one or more specified properties, the tunable photocathode comprising:
   a photoemission layer, the photoemission layer comprising quantum confined nanostructures configured to emit quantized free electrons in the form of a coherent electron beam.

2. The tunable photocathode of claim 1, further comprising a substrate under the photoemission layer.

3. The tunable photocathode of claim 2, wherein the substrate comprises a conductive material selected from Au, Ag, Al, In, Mg, Ca, Zr, stainless steel, ITO, and/or IZO.

4. The tunable photocathode of claim 1, further comprising a resonant tunneling transmission layer on the photoemission layer.

5. The tunable photocathode of claim 1, wherein the photoemission layer has a thickness of about 10 nm to about 1 μm.

6. The tunable photocathode of claim 1, wherein the quantum confined nanostructures comprise one or more elements selected from Cu, Ag, Zn, Cd, Hg, Ga, In, Si, Ge, Sn, P, As, Sb, S, Se, and Te.

7. The tunable photocathode of claim 6, wherein the quantum confined nanostructures comprise at least one semiconductor material selected from a Group IV semiconductor, a II-VI semiconductor, a IV-VI semiconductor, a III-V semiconductor, a II-V semiconductor, and a I-III-VI semiconductor.

8. The tunable photocathode of claim 7, wherein the quantum confined nanostructures comprise at least one selected from CdSe, ZnSe, CdS, ZnS, and PbSe.

9. The tunable photocathode of claim 1, wherein the quantum confined nanostructures comprise one or more semiconductor quantum dots (QDs).

10. The tunable photocathode of claim 9, wherein the semiconductor quantum dots comprise two or more semiconductor materials and have a core/shell structure or a heterostructure.

11. The tunable photocathode of claim 10, wherein the semiconductor quantum dots comprise quasi-type-II CdSe/CdS core/shell quantum dots.

12. The tunable photocathode of claim 1, wherein the quantum confined nanostructures comprise one or more ligands selected from $F^-$, $Cl^-$, $Br^-$, $I^-$, $S^{2-}$, $OH^-$, $N_3^-$, $SCN^-$, $CN^-$, $SeCN^-$, $HS^-$, $HSe^-$, $NH_2^-$, $PbSe_2^{2-}$, $SnS_4^{4-}$, and ligands including a thiol group, an amine group, a carboxylate group, and/or a phosphonate group.

13. A vacuum electronic device comprising:
the tunable photocathode of claim 1;
an anode; and
a light source,
wherein the tunable photocathode and anode are under vacuum and the light source is directed toward the tunable photocathode.

14. A method of generating an electron beam, the method comprising:
exciting a photocathode with a light source to emit electrons, the photocathode comprising:
a substrate; and
a photoemission layer on the substrate, the photoemission layer comprising quantum confined nanostructures configured to emit quantized free electrons in the form of a coherent electron beam.

15. The method of claim 14, wherein the quantum confined nanostructures comprise one or more elements selected from Cu, Ag, Zn, Cd, Hg, Ga, In, Si, Ge, Sn, Pb, P, As, Sb, S, Se, and Te.

16. The method of claim 15, wherein the quantum confined nanostructures comprise at least one semiconductor material selected from a Group IV semiconductor, a II-VI semiconductor, a IV-IV semiconductor, a III-V semiconductor, a II-V semiconductor, and a I-III-VI semiconductor.

17. The method of claim 16, wherein the quantum confined nanostructures comprise at least one selected from CdSe, ZnSe, CdS, ZnS, and PbSe.

18. The method of claim 14, wherein the quantum confined nanostructures comprise one or more semiconductor quantum dots (QDs).

19. The method of claim 18, wherein the semiconductor quantum dots (QDs) comprise two or more semiconductor materials and have a core/shell structure or a heterostructure.

20. The method of claim 19, wherein the semiconductor quantum dots (QDs) comprise quasi-type-II CdSe/CdS core/shell quantum dots.

\* \* \* \* \*